US012560916B2

(12) United States Patent (10) Patent No.: US 12,560,916 B2
Bhatia et al. (45) Date of Patent: Feb. 24, 2026

(54) ADJUSTING CHAMBER PERFORMANCE BY EQUIPMENT CONSTANT UPDATES

(71) Applicant: Applied Materials, Inc., Santa Clara, CA (US)

(72) Inventors: Sidharth Bhatia, Santa Cruz, CA (US); Roger Lindley, Santa Clara, CA (US); Upendra Ummethala, Cupertino, CA (US); Thomas Li, Santa Clara, CA (US); Michael Howells, San Jose, CA (US); Steven Babayan, Los Altos, CA (US); Mimi-Diemmy Dao, Santa Clara, CA (US)

(73) Assignee: Applied Materials, Inc., Santa Clara, CA (US)

( * ) Notice: Subject to any disclaimer, the term of this patent is extended or adjusted under 35 U.S.C. 154(b) by 435 days.

(21) Appl. No.: 18/070,453

(22) Filed: Nov. 28, 2022

(65) Prior Publication Data

US 2024/0176334 A1      May 30, 2024

(51) Int. Cl.
G05B 19/418 (2006.01)
(52) U.S. Cl.
CPC ... G05B 19/41865 (2013.01); G05B 19/4188 (2013.01); G05B 19/41885 (2013.01); *G05B 2219/45031* (2013.01)
(58) Field of Classification Search
CPC .................... G05B 19/4188; G05B 19/41885
(Continued)

(56) References Cited

U.S. PATENT DOCUMENTS 6,587,744 B1    7/2003 Stoddard
6,763,277 B1    7/2004 Allen, Jr.
(Continued)

FOREIGN PATENT DOCUMENTS

KR        102268290 B1    6/2021
KR      20220147672 A    11/2022
WO      2021154747 A1    8/2021

OTHER PUBLICATIONS

International Search Report and Written Opinion for International Application No. PCT/US2023/080592, mailed Mar. 27, 2024, 09 Pages.
(Continued)

*Primary Examiner* — Ronald D Hartman, Jr.
(74) *Attorney, Agent, or Firm* — Lowenstein Sandler LLP

(57) ABSTRACT
A method includes receiving, by a processing device, first trace data associated with a first processing chamber, wherein the first processing chamber satisfies one or more performance metrics. The method further includes generating target trace data based on the first trace data associated with the first processing chamber. The method further includes receiving second trace data associated with a second processing chamber, wherein the second processing chamber does not satisfy the one or more performance metrics. The method further includes generating, based on the target trace data and the second trace data, a first recommended corrective action associated with the second processing chamber, wherein the first recommended corrective action includes updating one or more equipment constants of the second processing chamber. The method further includes performing the first recommended corrective action.

20 Claims, 8 Drawing Sheets

(58) Field of Classification Search
USPC .......................................................... 700/121
See application file for complete search history.

(56) References Cited

U.S. PATENT DOCUMENTS

| | | | |
|---|---|---|---|
| 6,842,660 B2 | 1/2005 | Tripathi | |
| 7,082,345 B2 * | 7/2006 | Shanmugasundram | ..................... G05B 19/41865 700/121 |
| 7,174,230 B2 | 2/2007 | Arackaparambil | |
| 7,257,458 B1 | 8/2007 | Markle | |
| 7,337,019 B2 | 2/2008 | Reiss | |
| 7,966,087 B2 | 6/2011 | Kokotov | |
| 9,008,833 B2 | 4/2015 | Hoffman | |
| 10,962,951 B2 | 3/2021 | Volkovich et al. | |
| 11,101,173 B2 * | 8/2021 | Clark | ................ H01L 21/76831 |
| 11,443,966 B2 | 9/2022 | Wei et al. | |
| 2002/0082738 A1 | 6/2002 | Goldman | |
| 2003/0014145 A1 | 1/2003 | Reiss | |
| 2004/0083021 A1 | 4/2004 | Somekh | |
| 2007/0180324 A1 | 8/2007 | Nakamura et al. | |
| 2007/0288409 A1 | 12/2007 | Mukherjee et al. | |
| 2007/0293968 A1 | 12/2007 | Fu | |
| 2010/0249976 A1 | 9/2010 | Aharoni et al. | |
| 2014/0031969 A1 * | 1/2014 | Baseman | ............. G05B 13/048 700/121 |
| 2018/0082826 A1 | 3/2018 | Guha et al. | |
| 2020/0019858 A1 | 1/2020 | Han et al. | |
| 2020/0110341 A1 | 4/2020 | Mossavat et al. | |
| 2020/0110390 A1 | 4/2020 | Banna | |
| 2020/0243359 A1 | 7/2020 | Hao et al. | |
| 2020/0264335 A1 | 8/2020 | Bhatia | |
| 2020/0333774 A1 | 10/2020 | Banna | |
| 2021/0020410 A1 | 1/2021 | Nichols | |
| 2021/0042570 A1 | 2/2021 | Iskandar et al. | |
| 2021/0116896 A1 | 4/2021 | Arabshahi | |
| 2022/0344184 A1 | 10/2022 | Sadeghi | |
| 2023/0059313 A1 * | 2/2023 | Maher | ................ G05B 13/0265 |
| 2023/0163002 A1 * | 5/2023 | Han | .................. H01L 21/67253 700/109 |
| 2023/0185255 A1 * | 6/2023 | Hong | .................... G06F 18/214 700/121 |
| 2024/0176338 A1 | 5/2024 | Li et al. | |

OTHER PUBLICATIONS

International Search Report and Written Opinion for International Application No. PCT/US2023/080599, mailed Mar. 22, 2024, 09 Pages.

International Search Report and Written Opinion for International Application No. PCT/US2023/80605, mailed Mar. 15, 2024, 09 Pages.

International Search Report and Written Opinion for International Application No. PCT/US2024/060215, mailed Apr. 17, 2025, 12 Pages.

* cited by examiner

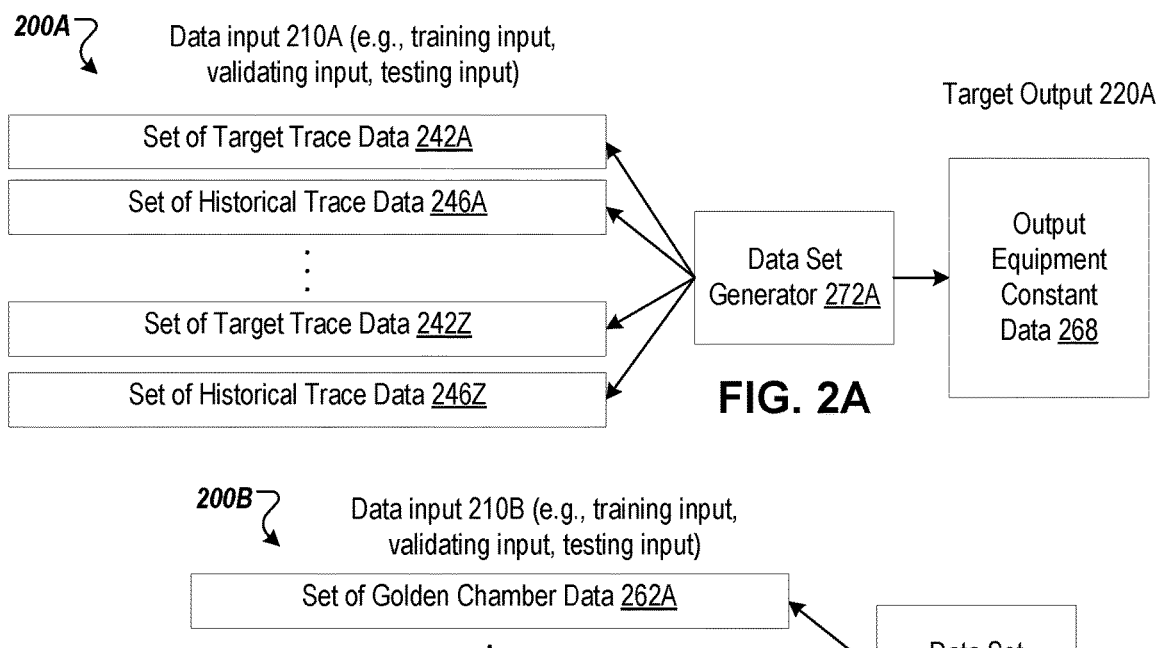

200A

Data input 210A (e.g., training input, validating input, testing input)

Target Output 220A

Set of Target Trace Data 242A

Set of Historical Trace Data 246A

...

Set of Target Trace Data 242Z

Set of Historical Trace Data 246Z

Data Set Generator 272A

Output Equipment Constant Data 268

Data input 210B (e.g., training input, validating input, testing input)

Set of Golden Chamber Data 262A

...

Set of Golden Chamber Data 262Z

Data Set Generator 272B

FIG. 2B

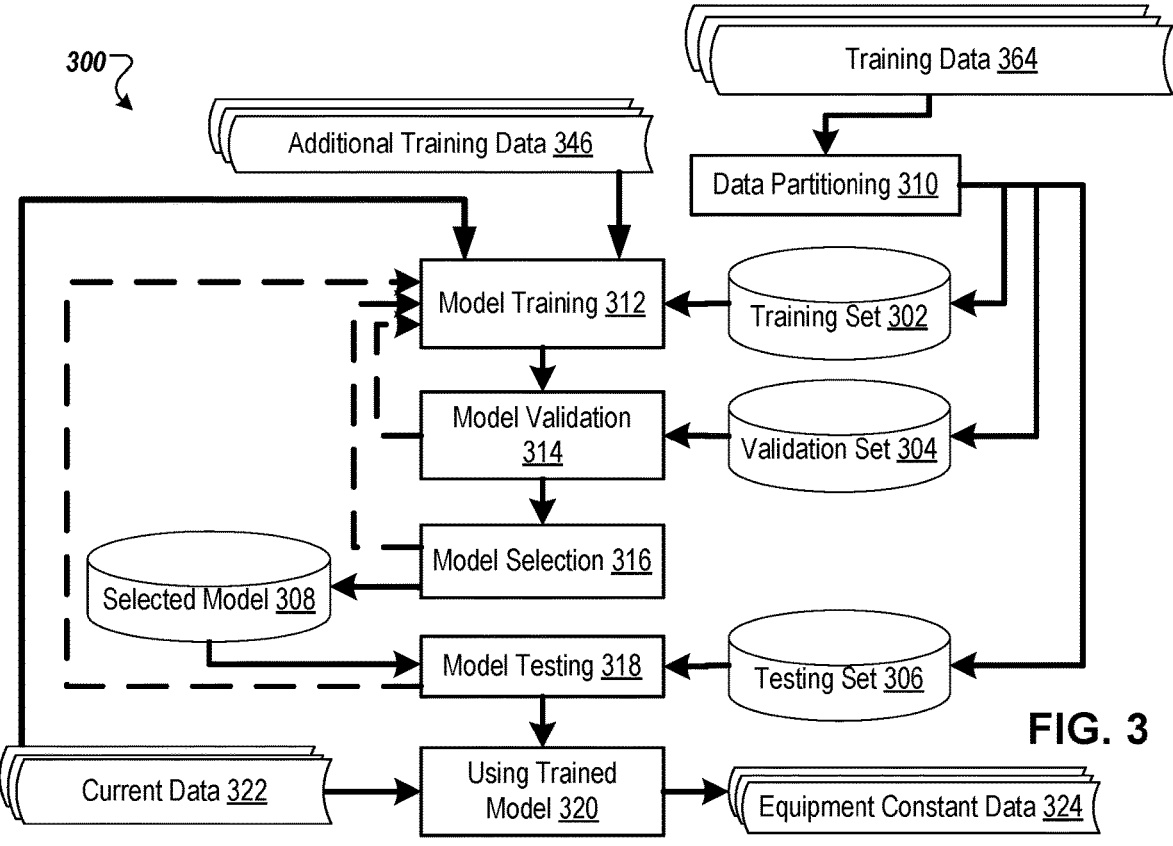

300

Training Data 364

Additional Training Data 346

Data Partitioning 310

Model Training 312

Training Set 302

Model Validation 314

Validation Set 304

Model Selection 316

Selected Model 308

Model Testing 318

Testing Set 306

Current Data 322

Using Trained Model 320

Equipment Constant Data 324

FIG. 3

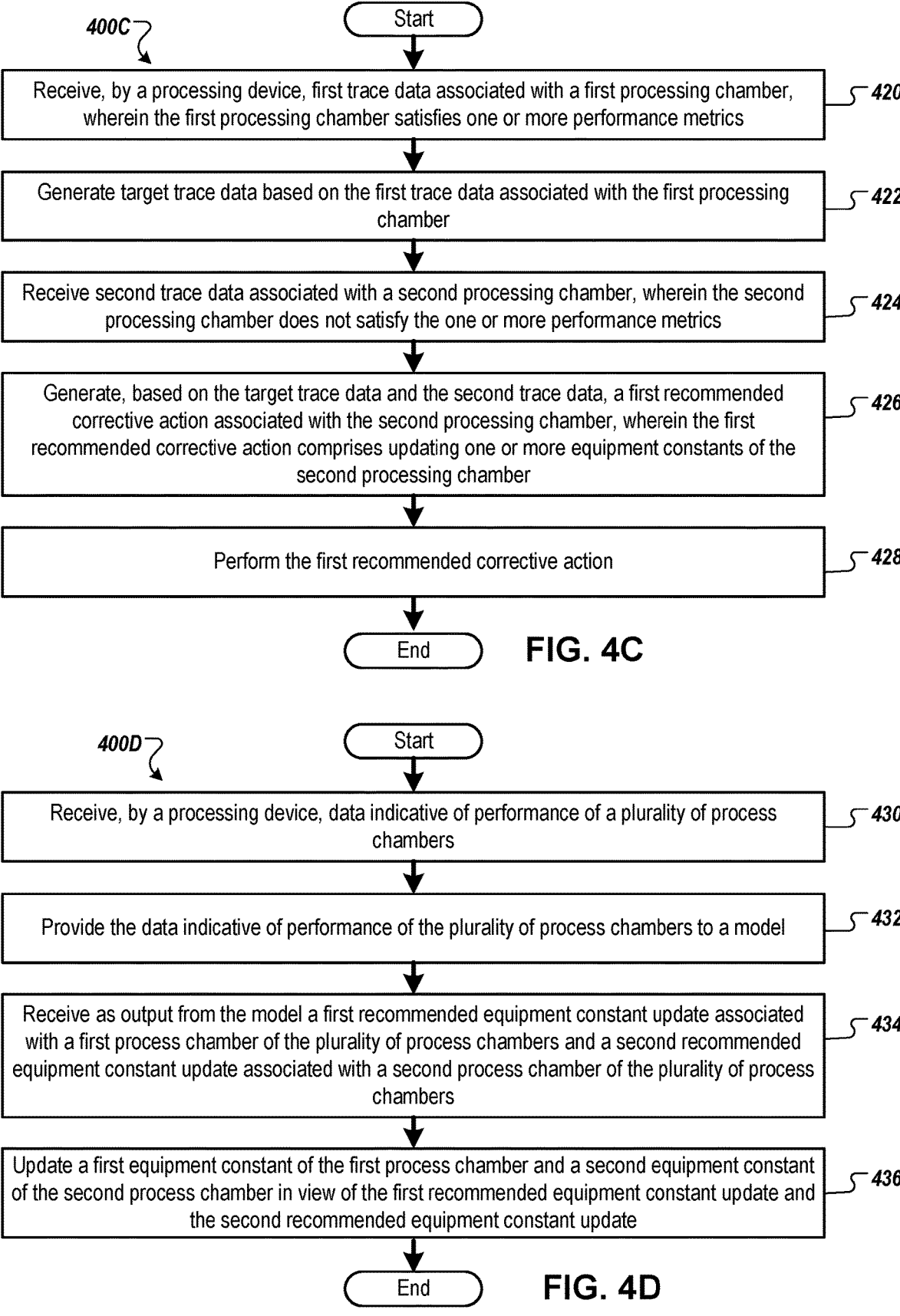

400C

Start

Receive, by a processing device, first trace data associated with a first processing chamber, wherein the first processing chamber satisfies one or more performance metrics ⎓420

Generate target trace data based on the first trace data associated with the first processing chamber ⎓422

Receive second trace data associated with a second processing chamber, wherein the second processing chamber does not satisfy the one or more performance metrics ⎓424

Generate, based on the target trace data and the second trace data, a first recommended corrective action associated with the second processing chamber, wherein the first recommended corrective action comprises updating one or more equipment constants of the second processing chamber ⎓426

Perform the first recommended corrective action ⎓428

End    FIG. 4C

400D

Start

Receive, by a processing device, data indicative of performance of a plurality of process chambers ⎓430

Provide the data indicative of performance of the plurality of process chambers to a model ⎓432

Receive as output from the model a first recommended equipment constant update associated with a first process chamber of the plurality of process chambers and a second recommended equipment constant update associated with a second process chamber of the plurality of process chambers ⎓434

Update a first equipment constant of the first process chamber and a second equipment constant of the second process chamber in view of the first recommended equipment constant update and the second recommended equipment constant update ⎓436

End    FIG. 4D

400E

Start

Perform a process operation on a plurality of substrates using a plurality of process chambers ⟋ 440

Receive data indicative of performance of the plurality of process chambers ⟋ 442

Compare differences between process chamber data ⟋ 444

Recommend and/or perform corrective actions associated with one or more of the plurality of process chambers ⟋ 446

End

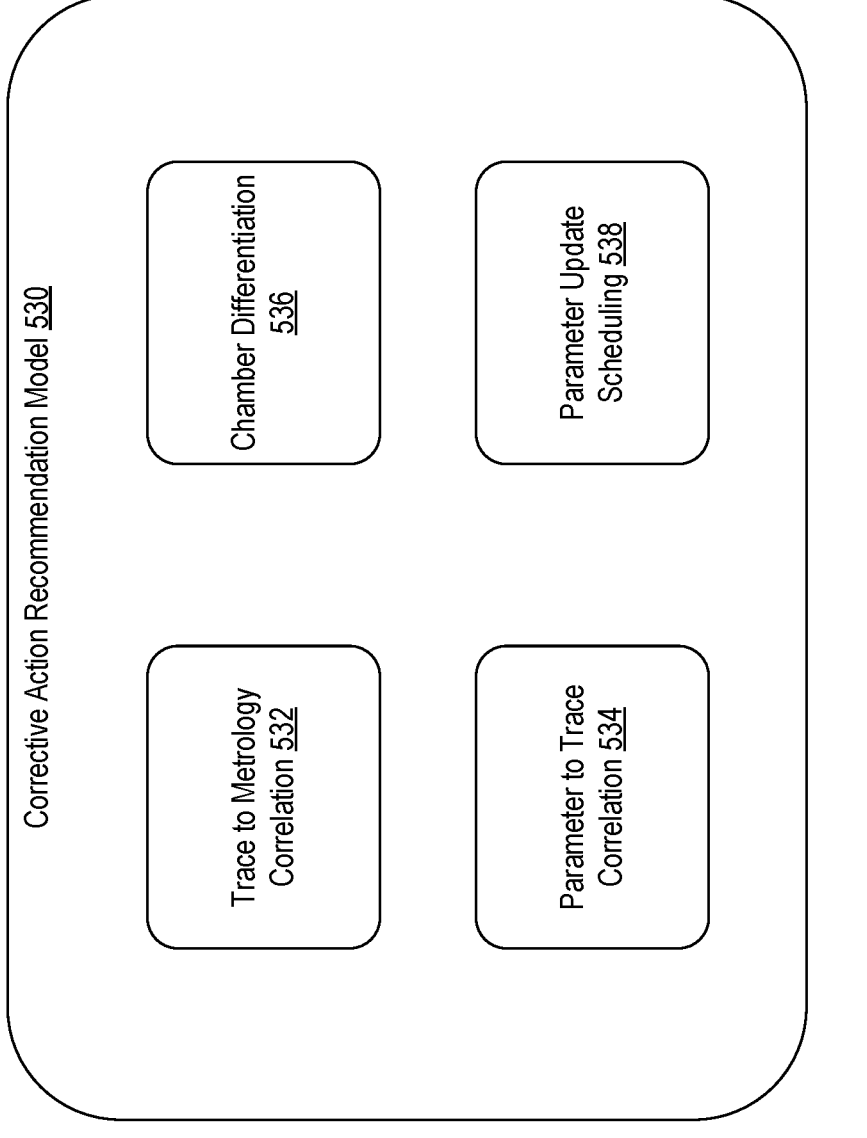
FIG. 5B

ADJUSTING CHAMBER PERFORMANCE BY EQUIPMENT CONSTANT UPDATES

TECHNICAL FIELD

The present disclosure relates to methods associated with machine learning models used for assessment of manufactured devices, such as semiconductor devices. More particularly, the present disclosure relates to methods for generating and utilizing equipment constant updates to improve or standardize the performance of manufacturing chambers.

BACKGROUND

Products may be produced by performing one or more manufacturing processes using manufacturing equipment. For example, semiconductor manufacturing equipment may be used to produce substrates via semiconductor manufacturing processes. Products are to be produced with particular properties, suited for a target application. Machine learning models are used in various process control and predictive functions associated with manufacturing equipment. Machine learning models are trained using data associated with the manufacturing equipment. Changes may be made to process recipes, process chambers, process procedures, or the like to improve properties of the produced products.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular embodiments of the disclosure or any scope of the claims. Its sole purpose is to present some concepts of the disclosure in a simplified form as a prelude to the more detailed description that is presented later.

In one aspect of the present disclosure, a method includes receiving, by a processing device, first trace data associated with a first processing chamber, wherein the first processing chamber satisfies one or more performance metrics. The method further includes generating target trace data based on the first trace data associated with the first processing chamber. The method further includes receiving second trace data associated with a second processing chamber, wherein the second processing chamber does not satisfy the one or more performance metrics. The method further includes generating, based on the target trace data and the second trace data, a first recommended corrective action associated with the second processing chamber, wherein the first recommended corrective action includes updating one or more equipment constants of the second processing chamber. The method further includes performing the first recommended corrective action.

In another aspect of the present disclosure, a system includes memory and a processing device coupled to memory. The processing device is to receive first trace data associated with a first processing chamber, wherein the first processing chamber satisfies one or more performance metrics. The processing device is further to generate target trace data based on the first trace data associated with the first processing chamber. The processing device is further to receive second trace data associated with a second processing chamber, wherein the second processing chamber does not satisfy the one or more performance metrics. The processing device is further to generate, based on the target trace data and the second trace data, a first recommended corrective action associated with the second processing chamber, wherein the first recommended corrective action comprises updating one or more equipment constants of the second processing chamber. The processing device is further to perform the first recommended corrective action.

In another aspect of the present disclosure, a non-transitory machine-readable storage medium stores instruction. The instructions, when executed, cause a processing device to perform operations. The operations include receiving first trace data associated with a first processing chamber, wherein the first processing chamber satisfies one or more performance metrics. The operations further include generating target trace data based on the first trace data associated with the first processing chamber. The operations further include receiving second trace data associated with a second processing chamber, wherein the second processing chamber does not satisfy the one or more performance metrics. The operations further include generating, based on the target trace data and the second trace data, a first recommended corrective action associated with the second processing chamber, wherein the first recommended corrective action comprises updating one or more equipment constants of the second processing chamber. The operations further include performing the first recommended corrective action.

BRIEF DESCRIPTION OF THE DRAWINGS

The present disclosure is illustrated by way of example, and not by way of limitation in the figures of the accompanying drawings.

FIG. 2A depicts a block diagram of an example data set generator for creating data sets for one or more supervised models, according to some embodiments.

FIG. 2B depicts a block diagram of an example data set generator for creating data sets for one or more unsupervised models, according to some embodiments.

FIG. 3 is a block diagram illustrating a system for generating output data, according to some embodiments.

FIG. 4C is a flow diagram of a method for performing a corrective action associated with a processing chamber, according to some embodiments.

FIG. 4D is a flow diagram of a method for adjusting equipment constants of chambers of a fleet of chambers, according to some embodiments.

FIG. 5B is a block diagram depicting operations of a corrective action recommendation model 530, according to some embodiments.

DETAILED DESCRIPTION

Figure 1:
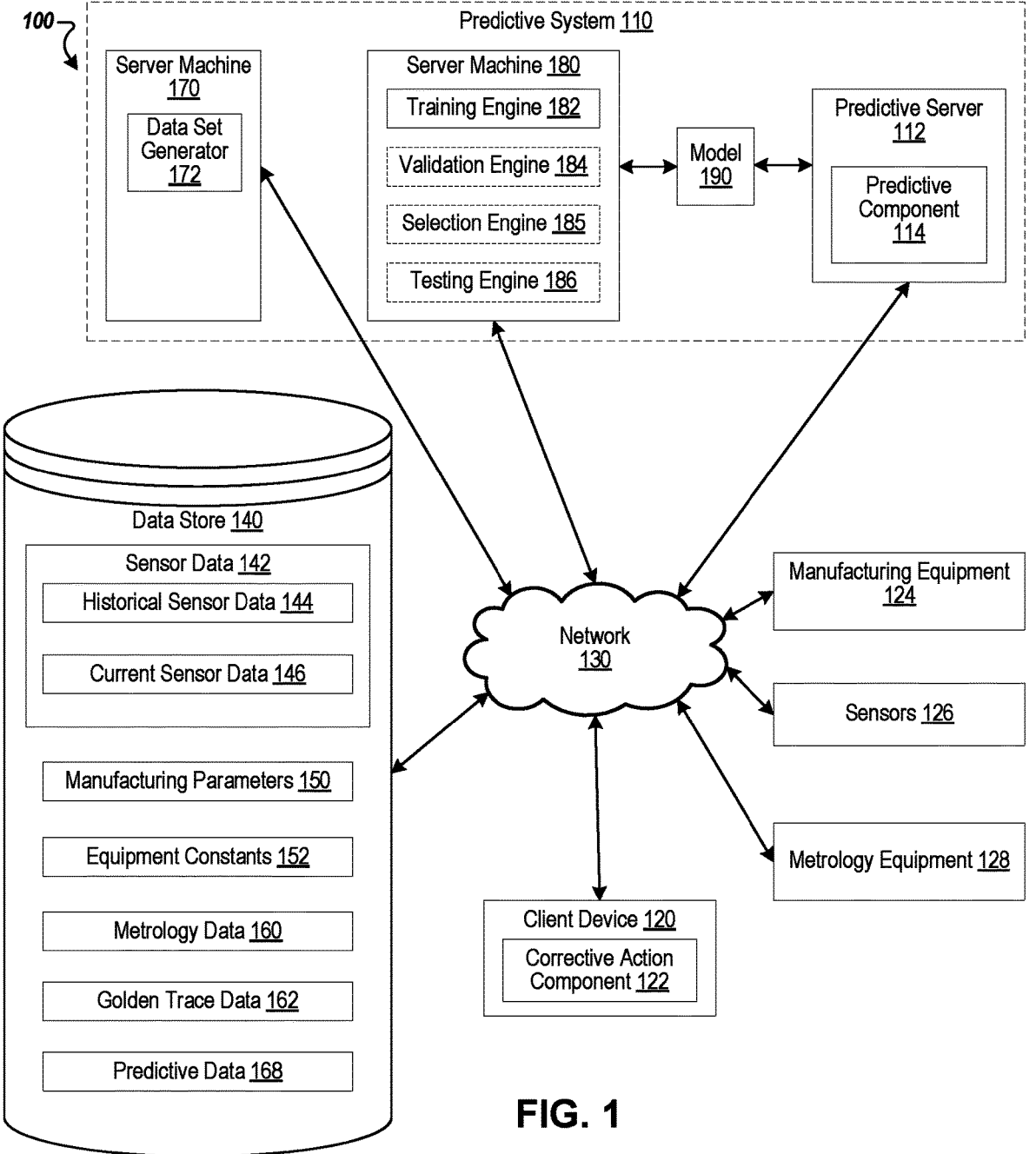
FIG. 1 is a block diagram illustrating an exemplary system architecture, according to some embodiments.

Described herein are technologies related to increasing performance of manufacturing equipment by updating equipment constants. Manufacturing equipment is used to produce products, such as substrates (e.g., wafers, semiconductors). Manufacturing equipment may include one or more manufacturing or processing chambers to separate the substrate from the environment. The properties of produced substrates are to meet target values to facilitate specific functionalities. Manufacturing parameters are selected to produce substrates that meet the target property values. Many manufacturing parameters (e.g., hardware parameters, process parameters, etc.) contribute to the properties of processed substrates.

Manufacturing parameters, as used herein, include processing recipes and equipment constants. Processing recipes include parameters selected to generate a processing outcome, e.g., to enable processing of a substrate characterized by one or more target properties. Processing recipes may include parameters selected and/or adjusted based on product design, target output, target substrate metrology, etc. Processing recipes may include parameters such as processing temperature, processing pressure, processing gas, radio frequency (RF) radiation properties, plasma properties, etc. Equipment constants include parameters associated with operation of the manufacturing equipment. Equipment constants may include parameters that support the implementation of processing recipes. Equipment constants may not be associated with a particular process, recipe, substrate design, target property, etc. Equipment constants may be associated with a set of manufacturing equipment, a processing tool, a process chamber, one or more components, etc. Equipment constants may include control settings, e.g., settings of voltage or current to apply to a component in order to achieve a target output (e.g., as defined by a processing recipe). Equipment constants may include operation settings, e.g., settings for operations of components not immediately related to process recipe outputs, such as transfer robot speeds, voltages to apply to components to operate the components, etc.

Equipment constants may include standalone values, such as a speed of operation to be utilized for a pump, an acceptable pressure to consider a chamber to have been vented or evacuated, etc. Equipment constants may include tables of values, such as tables relating an input setting (such as a processing recipe input) to an action (such as a voltage to apply to a component to achieve the input). Equipment constants may include functions, e.g., a function that may be utilized to calculate an appropriate action for a target condition (e.g., as defined by a processing recipe). Equipment constants may include calibration tables and/or calibration constants, e.g., adjustments to standard or factory settings of a component. Equipment constants may include constants associated with one or more controllers. Equipment constants may include parameters associated with a proportional-integral-derivative (PID) controller, e.g., parameters determining the effect on controller output based on controller input.

Equipment constants may form a basis of many operations of manufacturing equipment. Equipment constants may include parameters controlling robot motion, chamber pressurization, chamber pumping, gas flow and mixing, temperature control, plasma generation, substrate securing mechanisms, in-chamber metrology systems, and any other operations performed by a manufacturing system.

Manufacturing systems may control processing conditions (e.g., conditions in a process chamber) by specifying a set point for a property value, receiving data from sensors disposed within the manufacturing chamber, and making adjustments to the manufacturing equipment until the sensor readings match the set point. In some embodiments, set points may be defined by processing recipes, e.g., a process temperature may be defined, and a temperature sensor may be maintained at the defined temperature. In some embodiments, set points may be defined by equipment constants, e.g., a target process temperature may be defined, and a table of equipment constants relating the target temperature (e.g., a temperature at a location that is not directly probed by a temperature sensor) to temperature readings by one or more sensors of the process chamber may be consulted. The power provided to one or more heaters may be adjusted to maintain the temperatures at the sensors associated with the set point temperature and the equipment constant table.

Process results may vary between sets of manufacturing equipment, tools, facilities, chambers, etc. A particular tool, chamber, or the like, may generate acceptable (meeting specific conditions or requirements) products, e.g., may generate substrates meeting target property value ranges more frequently than other equipment. Equipment may meet one or more conditions by frequently generating acceptable products for a range of time, e.g., after preventative or corrective maintenance, after seasoning, after installation, etc. Such equipment may be referred to as "golden" equipment. Herein, the phrase "golden chamber" will be used for brevity, but golden equipment may include a golden tool, a golden set of equipment, a golden fabrication facility, etc.

Golden traces may include trace data associated with one or more processing operations, e.g., operations that resulted in acceptable products (e.g., substrates meeting target performance thresholds, target metrology values, etc.). Golden traces may be obtained from sensors of a golden chamber. Golden trace data may be collected during processing of products by the golden chamber. Associated with one or more acceptable products (e.g., substrates that achieve target property values) and one or more golden chambers, golden traces may indicate sensor data measured during processing.

In traditional systems, operations of a processing tool, chamber, facility, etc., may be altered and/or adjusted to improve performance. Operations may be adjusted to enable productions of products meeting target performance metrics (e.g., target metrology values). Operations may be adjusted to increase likelihood of producing products meeting target performance metrics. Operations may be adjusted to increase efficiency of a manufacturing system, e.g., in terms of materials expended, time used, energy expended, etc. Operations may be adjusted to decrease cost per acceptable product, e.g., including reducing costs from disposing of faulty products, costs of analyzing faulty products, etc.

In conventional systems, operations of manufacturing equipment may be adjusted to enable closer alignment between trace data collected from the manufacturing equipment and golden trace data. Operations of a process chamber, for example, may be adjusted to bring trace data into closer alignment with golden trace data. Operations of manufacturing equipment may be adjusted to enable closer resemblance between the manufacturing equipment and a golden chamber.

In conventional systems, operations of manufacturing equipment may be adjusted by making changes to processing recipes. Processing recipes may be adjusted to improve product properties. Processing recipes may be adjusted to improve trace data, e.g., to cause trace data to resemble golden trace data. Processing recipes may be adjusted to improve manufacturing equipment, e.g., to cause performance of a process chamber to resemble a golden chamber.

There are several disadvantages with the conventional methods. Adjusting performance of a set of manufacturing equipment (e.g., a process chamber) to improve properties of products is an inefficient process. Updates may be made (e.g., to processing recipe parameters), substrates processed according to the updates, and metrology operations performed on the substrates. Relationships between recipe inputs and product outputs may be non-linear, may not be one-to-one (e.g., one recipe component may affect multiple substrate properties), etc. Performance of manufacturing equipment may also be related to aging or failing components, may be improved by preventative or corrective maintenance, etc. Difficulty in determining appropriate actions to improve product performance may result in increased time to correct equipment performance. This may result in increased downtime of the equipment, decreased productivity, decreased yield, etc. Determining corrective actions based on product performance may include increased cost of performing metrology, e.g., at a standalone metrology facility. Determining corrective actions based on product performance may include performing many processing runs (e.g., processing many products), increasing expenditure of energy, materials, and time, increasing cost associated with discarding defective products, increasing wear, aging, and/or drift of components, decreasing equipment productivity compared to unproductive time (e.g., decreasing chamber green time), etc.

Adjusting processing recipes to target matching (e.g., closer resemblance) of trace data and golden trace data also has disadvantages. Trace data is impacted by many aspects of a manufacturing process. Trace data is impacted by processing recipes. Trace data is impacted by equipment health, e.g., components aging, drifting, etc., may affect chamber performance, reflected in trace data. Trace data may be impacted by equipment constants. Adjusting processing recipes to target matching of trace data and golden trace data utilizes a subset of available adjustable parameters (e.g., process knobs) to improve performance of manufacturing equipment. Adjusting processing recipes may be less efficient than other methods of trace data matching. Adjusting processing recipes may result in increased energy usage, increased material usage, decreased processing efficiency, etc., compared to other methods of trace data matching. Matching trace data by adjusting processing recipes may result in components of processing equipment being operated more frequently, more roughly, in a manner that generates more stress on the component, etc., than matching trace data via another method. For example, a temperature trace may be matched by increasing power supplied to a heater, which may generate harsher conditions for one or more components of a process chamber, may decrease a lifetime of one or more components of the process chamber, may increase drift and/or aging of one or more components of the process chamber, may increase overall energy usage of the process chamber, etc. Decreasing lifetimes of one or more components of a process chamber may increase the frequency of corrective and/or preventative maintenance, increase chamber downtime, decrease chamber green time, etc. Decreasing lifetimes of one or more components may increase expensive unplanned downtime, increase cost associated with replacing components, including component cost, express shipping costs, etc.

Aspects of the present disclosure may address one or more of these shortcomings with conventional solutions. Equipment constants of manufacturing equipment may be adjusted. Herein, generally descriptions will refer to equipment constants of a chamber (e.g., a golden chamber) being utilized to update equipment constants of another chamber. Also applicable are implementations of utilizing or updating equipment constants of a tool, a facility, a group of tools (e.g., a group of similar tools), a group of chambers (e.g., several similarly performing chambers of a tool), etc. The chamber being updated may be a part of the same tool as the golden chamber or a different tool. The chamber being updated may be in the same facility as the golden chamber or a different facility.

Equipment constants differ from processing recipe parameters. Processing recipe parameters are generally related to set points values for one or more properties while processing. Processing recipe parameters may include property value set points (e.g., target temperature, target pressure, etc.), time (e.g., a span of time to hold a target temperature), evolution of set points over time (e.g., a temperature ramp-up), etc. Equipment constants are generally settings impacting operation of manufacturing equipment. Equipment constants may include non-process set points, e.g., transfer robot speed, gas flow for venting a lock, a number of processing operations between automatic chamber cleaning and/or seasoning operations are performed, boundaries of leak check results that generate an alert, etc. Equipment constants may include settings relevant during processing, e.g., boundaries of pressure of a chamber pumping system that trigger an alert, gas control parameters for delivering process gas to a process chamber, etc. Equipment constants may include calibration tables, e.g., to relate set point values to control signals.

In some embodiments, one or more equipment constants of a golden chamber (or, as appropriate, a golden tool, golden facility, etc.) may be applied to a process chamber (e.g., an underperforming chamber). In some embodiments, equipment constants may be classified by risk incurred by updating the equipment constants. For example, an equipment constant that is unlikely to highly negatively affect a process if changed (e.g., transfer robot speed, inert gas flow to vent a lock, etc.) may be considered a low risk equipment constant. An equipment constant that is likely to negatively affect a process if changed (e.g., radio frequency (RF) control, plasma generation control, process gas mixing and delivery, pressure and/or temperature control, etc.) may be considered high risk. Risk of an equipment constant may be assessed by subject matter experts, statistical models, physics-based models, machine learning models, etc. Action to update one or more equipment constants of a process chamber may be taken based on assessed risk.

In some embodiments, one or more machine learning models may be utilized to determine corrective updates to equipment constants. A machine learning model may be utilized to assess the impact of one or more equipment constants, e.g., impact on product performance, impact on trace data, impact on variability of products, etc. A machine learning model may be utilized to determine a target equipment constant from input data including equipment constants and indications of equipment performance. A machine learning model may be utilized to determine outlier equipment constants, e.g., outlier calibration tables. A machine learning model may be utilized to determine an optimal time to perform maintenance on manufacturing equipment, e.g., to perform a manual calibration. A machine learning model may cause operations to be performed associated with updating equipment constants, e.g., a machine learning model may schedule, initiate, etc., a calibration operation. In some embodiments, a statistical model, physics-based model, or another type of model may be utilized to perform one or more of these operations instead of a machine-learning model.

In some embodiments, a machine learning model may be utilized to generate golden traces. The machine learning model may be provided with trace data as data input. The machine learning model may further be provided with metrology data of products associated with the trace data as data input. The machine learning model may be provided with data from one or more golden chambers. The machine learning model may be configured to generate one or more golden traces. In some embodiments, the machine learning model may generate a lower and upper golden trace bound. In some embodiments, the machine learning model may generate golden traces associated with multiple chamber sensors, multiple measured conditions (e.g., temperature, pressure, etc.), etc.

In some embodiments, a machine learning model may generate recommended updates to one or more equipment constants based on golden traces. The machine learning model may receive one or more golden traces as input. The golden traces may be generated by another machine learning model. The golden traces may include upper and lower bounds of golden traces. The golden traces may include traces associated with multiple process conditions, multiple sensors, etc. The machine learning model may further receive equipment constants from one or more process chamber, e.g., chambers that are not golden chambers, chambers that did not generate golden trace data, chambers that are underperforming, etc. The machine learning model may further receive trace data, e.g., associated with the same process chambers as the received equipment constants. The machine learning model may further receive metrology data, e.g., associated with the same process chambers as the received equipment constants. The machine learning model may generate as output recommended changes to equipment constants of one or more chambers. The machine learning model may generate a schedule of equipment constant updates, e.g., a recommended order to update equipment constants to facilitate monitoring the effects of changes to equipment constants. The machine learning model may generate one or more recommendations of maintenance operations (e.g., calibration, cleaning, seasoning, etc.). The machine learning model may initiate one or more maintenance operations. The machine learning model may perform optimization operations, e.g., may recommend updates to equipment constants that target improved chamber efficiency, improved chamber performance, improved energy efficiency, improved material expenditure, etc.

Aspects of the present disclosure provide technical advantages over conventional solutions. By updating equipment constants, a larger process altering space may be accessed than by updating processing recipes. Chamber adjustments may be performed that improve uniformity between different chambers. Chamber uniformity and/or performance may be improved across many different processing recipes, processing operations, types of processing, etc. Equipment constant updates may be based on information from a variety of sources, e.g., subject matter experts, physics-based models, statistical models, machine learning models, optimization algorithms, etc. Equipment constant updates may be made in connection with specific outcomes, e.g., in view of a relationship between one or more equipment constants and one or more substrate performance metrics.

In one aspect of the present disclosure, a method includes receiving, by a processing device, first trace data associated with a first processing chamber, wherein the first processing chamber satisfies one or more performance metrics. The method further includes generating target trace data based on the first trace data associated with the first processing chamber. The method further includes receiving second trace data associated with a second processing chamber, wherein the second processing chamber does not satisfy the one or more performance metrics. The method further includes generating, based on the target trace data and the second trace data, a first recommended corrective action associated with the second processing chamber, wherein the first recommended corrective action includes updating one or more equipment constants of the second processing chamber. The method further includes performing the first recommended corrective action.

In another aspect of the present disclosure, a system includes memory and a processing device coupled to memory. The processing device is to receive first trace data associated with a first processing chamber, wherein the first processing chamber satisfies one or more performance metrics. The processing device is further to generate target trace data based on the first trace data associated with the first processing chamber. The processing device is further to receive second trace data associated with a second processing chamber, wherein the second processing chamber does not satisfy the one or more performance metrics. The processing device is further to generate, based on the target trace data and the second trace data, a first recommended corrective action associated with the second processing chamber, wherein the first recommended corrective action comprises updating one or more equipment constants of the second processing chamber. The processing device is further to perform the first recommended corrective action.

In another aspect of the present disclosure, a non-transitory machine-readable storage medium stores instruction. The instructions, when executed, cause a processing device to perform operations. The operations include receiving first trace data associated with a first processing chamber, wherein the first processing chamber satisfies one or more performance metrics. The operations further include generating target trace data based on the first trace data associated with the first processing chamber. The operations further include receiving second trace data associated with a second processing chamber, wherein the second processing chamber does not satisfy the one or more performance metrics. The operations further include generating, based on the target trace data and the second trace data, a first recommended corrective action associated with the second processing chamber, wherein the first recommended corrective action comprises updating one or more equipment constants of the second processing chamber. The operations further include performing the first recommended corrective action FIG. 1 is a block diagram illustrating an exemplary system 100 (exemplary system architecture), according to some embodiments. The system 100 includes a client device 120, manufacturing equipment 124, sensors 126, metrology equipment 128, predictive server 112, and data store 140. The predictive server 112 may be part of predictive system 110. Predictive system 110 may further include server machines 170 and 180.

Sensors 126 may provide sensor data 142 associated with manufacturing equipment 124 (e.g., associated with producing, by manufacturing equipment 124, corresponding products, such as substrates). Sensor data 142 may be used to ascertain equipment health and/or product health (e.g., product quality). Sensor data 142 may include trace data, e.g., data generated by a sensor multiple times over a duration of a process. Trace data may include values associated with times at which the associated measurements were performed. Manufacturing equipment 124 may produce products following a recipe or performing runs over a period of time. In some embodiments, sensor data 142 may include values of one or more of optical sensor data, spectral data, temperature (e.g., heater temperature), spacing (SP), pressure, High Frequency Radio Frequency (HFRF), radio frequency (RF) match voltage, RF match current, RF match capacitor position, voltage of Electrostatic Chuck (ESC), actuator position, robot position, electrical current, flow, power, voltage, etc. Sensor data 142 may include historical sensor data 144 and current sensor data 146. Current sensor data 146 may be associated with a product (e.g., substrate, semiconductor wafer, etc.) currently being processed, a product recently processed, a number of recently processed products, etc. Current sensor data 146 may be used as input to a trained machine learning model, e.g., to generate predictive data 168. Historical sensor data 144 may include data stored associated with previously produced products. Historical sensor data 144 may be used to train a machine learning model, e.g., model 190. Historical sensor data 144 and/or current sensor data 146 may include attribute data, e.g., labels of manufacturing equipment ID or design, sensor ID, type, and/or location, label of a state of manufacturing equipment, such as a present fault, service lifetime, etc.

Sensor data 142 may be associated with or indicative of manufacturing parameters such as hardware parameters (e.g., hardware settings or installed components, e.g., size, type, etc.) of manufacturing equipment 124 or process parameters (e.g., heater settings, gas flow, etc.) of manufacturing equipment 124.

Data associated with some hardware parameters and/or process parameters may, instead or additionally, be stored as manufacturing parameters 150, which may include historical manufacturing parameters (e.g., associated with historical processing runs) and current manufacturing parameters. Manufacturing parameters 150 may be indicative of input settings to the manufacturing device (e.g., heater power, gas flow, etc.). Manufacturing parameters 150 may be or include components of processing recipes, e.g., to be performed by manufacturing equipment 124. Sensor data 142 and/or manufacturing parameters 150 may be provided while the manufacturing equipment 124 is performing manufacturing processes (e.g., equipment readings while processing products). Sensor data 142 may be different for each product (e.g., each substrate). Manufacturing parameters 150 may be different for each product design, each recipe, etc. manufacturing parameters 150 may be customized based on manufacturing equipment 124, e.g., customized for performance of a particular process chamber. Substrates produced by manufacturing equipment 124 may have property values (film thickness, film strain, etc.) measured by metrology equipment 128, e.g., measured at a standalone metrology facility. Metrology data 160 may be a component of data store 140. Metrology data 160 may include historical metrology data 164 (e.g., metrology data associated with previously processed products).

Manufacturing parameters 150 may include hardware parameters (e.g., information indicative of which components are installed in manufacturing equipment 124, indicative of component replacements, indicative of component age, indicative of software version or updates, etc.) and/or process parameters (e.g., temperature, pressure, flow, rate, electrical current, voltage, gas flow, lift speed, etc.).

In some embodiments, metrology data 160 may be provided without use of a standalone metrology facility, e.g., in-situ metrology data (e.g., metrology or a proxy for metrology collected during processing), integrated metrology data (e.g., metrology or a proxy for metrology collected while a product is within a chamber or under vacuum, but not during processing operations), inline metrology data (e.g., data collected after a substrate is removed from vacuum), etc. Metrology data 160 may include current metrology data (e.g., metrology data associated with a product currently or recently processed), historical metrology data, etc. Historical metrology data may be utilized in training one or more machine learning models.

Equipment constants 152 may include settings, parameters, calibrations, etc., associated with manufacturing equipment 124. Equipment constants may be stored in association with a process chamber, a process tool, a process facility, groups of these, etc. Equipment constants may be provided for training models. Equipment constants may be provided as input to one or more models. Equipment constants (e.g., equipment constant updates) may be received as output from one or more models.

In some embodiments, sensor data 142, metrology data 160, manufacturing parameters 150, and/or equipment constants 152 may be processed (e.g., by the client device 120 and/or by the predictive server 112). Processing of the data may include generating features. In some embodiments, the features are a pattern in the sensor data 142, metrology data 160, and/or manufacturing parameters 150 (e.g., slope, width, height, peak, etc.) or a combination of values from the sensor data 142, metrology data 160, equipment constants 152, and/or manufacturing parameters (e.g., power derived from voltage and current, etc.). Data may include features and the features may be used by predictive component 114 for performing signal processing and/or for obtaining predictive data 168 for performance of a corrective action.

Each instance (e.g., set) of sensor data 142 may correspond to a product (e.g., a substrate), a set of manufacturing equipment, a type of substrate produced by manufacturing equipment, or the like. Each instance of metrology data 160 and manufacturing parameters 150 may likewise correspond to a product, a set of manufacturing equipment, a type of substrate produced by manufacturing equipment, or the like. The data store may further store information associating sets of different data types, e.g. information indicative that a set of sensor data, a set of metrology data, a set of equipment constants, and a set of manufacturing parameters are all associated with the same product, manufacturing equipment, type of substrate, etc.

Golden trace data 162 may be or include sensor data that has been designated as golden data. Golden trace data 162 may be generated or selected (e.g., selected from sensor data 142) by a model. Golden trace data 162 may be generated or selected by a machine learning model. Golden trace data 162 may include data associated with one or more measured properties, one or more sensors, etc. Golden trace data 162 may include upper and lower golden trace limits, e.g., guardbands.

Predictive data 168 may include recommended corrective actions. Predictive data 168 may include updates to equipment constants for one or more process chambers. Predictive data 168 may include scheduled updates. Predictive data 168 may include scheduled maintenance, e.g., scheduled recommended preventative or corrective maintenance. Predictive data 168 may include scheduled automatic maintenance, e.g., component calibration, process chamber cleaning or seasoning operations, etc. In some embodiments, predictive system 110 may generate predictive data 168 using supervised machine learning (e.g., predictive data 168 includes output from a machine learning model that was trained using labeled data, such as sensor data labeled with metrology data). In some embodiments, predictive system 110 may generate predictive data 168 using unsupervised machine learning (e.g., predictive data 168 includes output from a machine learning model that was trained using unlabeled data, output may include clustering results, principle component analysis, anomaly detection, etc.). In some embodiments, predictive system 110 may generate predictive data 168 using semi-supervised learning (e.g., training data may include a mix of labeled and unlabeled data, etc.).

Data store 140 may further store synthetic data. Synthetic data may be data associated with one or more types of data stored in data store 140 (e.g., sensor data, manufacturing parameters, equipment constants, metrology data, etc.). Synthetic data may be data that is not generated by manufacturing equipment or sensors, data that is not associated with processing of one or more substrates, or the like. Synthetic data may be utilized to replace and/or augment data collected by/from manufacturing system 100. Synthetic data may be generated by a user, e.g., a subject matter expert. Synthetic data may be generated by a model, e.g., a statistical model, a machine learning model, a recursive neural network, or the like. Synthetic data may be provided as input to a model, provided as training input to a model, provided as target output to a model, etc. Synthetic data may be utilized to augment data types where insufficient data is available (e.g., for training a machine learning model), to fill gaps in trace data (e.g., to bridge an unsatisfactory portion of trace data between otherwise satisfactory trace data), or the like.

Client device 120, manufacturing equipment 124, sensors 126, metrology equipment 128, predictive server 112, data store 140, server machine 170, and server machine 180 may be coupled to each other via network 130 for generating predictive data 168 to perform corrective actions. In some embodiments, network 130 may provide access to cloud-based services. Operations performed by client device 120, predictive system 110, data store 140, etc., may be performed by virtual cloud-based devices.

In some embodiments, network 130 is a public network that provides client device 120 with access to the predictive server 112, data store 140, and other publicly available computing devices. In some embodiments, network 130 is a private network that provides client device 120 access to manufacturing equipment 124, sensors 126, metrology equipment 128, data store 140, and other privately available computing devices. Network 130 may include one or more Wide Area Networks (WANs), Local Area Networks (LANs), wired networks (e.g., Ethernet network), wireless networks (e.g., an 802.11 network or a Wi-Fi network), cellular networks (e.g., a Long Term Evolution (LTE) network), routers, hubs, switches, server computers, cloud computing networks, and/or a combination thereof.

Client device 120 may include computing devices such as Personal Computers (PCs), laptops, mobile phones, smart phones, tablet computers, netbook computers, network connected televisions ("smart TV"), network-connected media players (e.g., Blu-ray player), a set-top-box, Over-the-Top (OTT) streaming devices, operator boxes, etc. Client device 120 may include a corrective action component 122. Corrective action component 122 may receive user input (e.g., via a Graphical User Interface (GUI) displayed via the client device 120) of an indication associated with manufacturing equipment 124. In some embodiments, corrective action component 122 transmits the indication to the predictive system 110, receives output (e.g., predictive data 168) from the predictive system 110, determines a corrective action based on the output, and causes the corrective action to be implemented.

In some embodiments, corrective action component 122 obtains sensor data 142 (e.g., current sensor data 146) associated with manufacturing equipment 124 (e.g., from data store 140, etc.) and provides sensor data 142 (e.g., current sensor data 146) associated with the manufacturing equipment 124 to predictive system 110. In some embodiments, corrective action component 122 may obtain equipment constants 152 from data store 140 (e.g., updates to equipment constants recommended by predictive component 114) and provide the equipment constants 152 to manufacturing equipment 124 to update equipment constants of manufacturing equipment 124.

In some embodiments, corrective action component 122 receives an indication of a corrective action from the predictive system 110 and causes the corrective action to be implemented. Each client device 120 may include an operating system that allows users to one or more of generate, view, or edit data (e.g., indication associated with manufacturing equipment 124, corrective actions associated with manufacturing equipment 124, etc.).

In some embodiments, metrology data 160 (e.g., historical metrology data) corresponds to historical property data of products (e.g., products processed using manufacturing parameters associated with historical sensor data 144 and historical manufacturing parameters of manufacturing parameters 150) and predictive data 168 is associated with predicted property data (e.g., of products to be produced or that have been produced in conditions recorded by current sensor data 146 and/or current manufacturing parameters). In some embodiments, predictive data 168 is or includes predicted metrology data (e.g., virtual metrology data, virtual synthetic microscopy images) of the products to be produced or that have been produced according to conditions recorded as current sensor data 146, current measurement data, current metrology data and/or current manufacturing parameters. In some embodiments, predictive data 168 is or includes an indication of any abnormalities (e.g., abnormal products, abnormal components, abnormal manufacturing equipment 124, abnormal energy usage, abnormal equipment constants, etc.) and optionally one or more causes of the abnormalities. In some embodiments, predictive data 168 is an indication of change over time or drift in some component of manufacturing equipment 124, sensors 126, metrology equipment 128, and the like. In some embodiments, predictive data 168 is an indication of an end of life of a component of manufacturing equipment 124, sensors 126, metrology equipment 128, or the like. In some embodiments, predictive data 168 is an indication of progress of a processing operation being performed, e.g., to be used for process control.

Performing manufacturing processes that result in defective products can be costly in time, energy, products, components, manufacturing equipment 124, the cost of identifying the defects and discarding the defective product, etc. By inputting sensor data 142 (e.g., manufacturing parameters that are being used or are to be used to manufacture a product) into predictive system 110, receiving output of predictive data 168, and performing a corrective action based on the predictive data 168, system 100 can have the technical advantage of avoiding the cost of producing, identifying, and discarding defective products. By updating equipment constants of manufacturing equipment, equipment performance can be improved, standardized, and/or made more consistent, products meeting target performance metrics may be produced more often, and costs associated with manufacturing defective products may be avoided.

Performing manufacturing processes that result in failure of the components of the manufacturing equipment 124 can be costly in downtime, damage to products, damage to equipment, express ordering replacement components, etc. By inputting sensor data 142 (e.g., manufacturing parameters that are being used or are to be used to manufacture a product), metrology data, measurement data, etc., receiving output of predictive data 168, and performing corrective action (e.g., predicted operational maintenance, such as replacement, processing, cleaning, etc. of components) based on the predictive data 168, system 100 can have the technical advantage of avoiding the cost of one or more of unexpected component failure, unscheduled downtime, productivity loss, unexpected equipment failure, product scrap, or the like. Monitoring the performance over time of components, e.g. manufacturing equipment 124, sensors 126, metrology equipment 128, and the like, may provide indications of degrading components. Monitoring equipment constants 152 over time may provide indications of degrading components, e.g., if recommended equipment constants fall outside a control limit, outside a statistical limit, outside a guardband, or the like.

Manufacturing parameters may be suboptimal for producing product which may have costly results of increased resource (e.g., energy, coolant, gases, etc.) consumption, increased amount of time to produce the products, increased component failure, increased amounts of defective products, etc. By inputting indications of metrology into predictive system 110, receiving an output of predictive data 168, and performing (e.g., based on predictive data 168) a corrective action of updating equipment constants of manufacturing equipment 124 (e.g., setting optimal equipment constants), system 100 can have the technical advantage of using improved equipment constants (e.g., processing equipment constants, non-processing equipment constants, calibration tables, etc.) to avoid costly results of suboptimal equipment performance.

Manufacturing parameters may be suboptimal for reducing environmental impact of the manufacturing process. For example, a semiconductor manufacturing process utilizing a first set of manufacturing parameters may generate additional pollutants, waste, carbon dioxide and/or other greenhouse gasses, or the like, compared to performing the process utilizing a second set of manufacturing parameters. A manufacturing process may be less sustainable than another process with similar results (e.g., due to utilizing a combination of manufacturing parameters). By inputting indications of manufacturing equipment performance into predictive system 110, receiving output associated with corrective actions from predictive system 110, and enacting the corrective actions, system 100 may have the technical advantage of using improved equipment constants for reducing environmental impact of a manufacturing process.

Manufacturing parameters may be suboptimal for a rate of production of one or more products. Utilizing a particular set or range of sets of manufacturing parameters may result in faster production, faster processing, faster processing within acceptable defect limits, or the like. By inputting indications of manufacturing equipment performance into predictive system 110, receiving output associated with corrective actions from predictive system 110, and enacting the corrective actions, system 100 may have the technical advantage of reducing a time to process a product. System 100 may have the technical advantage of using improved equipment constants for reducing processing times per substrate, e.g., within target defect limits and/or other performance metrics.

Corrective actions may be associated with one or more of Computational Process Control (CPC), Statistical Process Control (SPC) (e.g., SPC on electronic components to determine process in control, SPC to predict useful lifespan of components, SPC to compare to a graph of 3-sigma, etc.), Advanced Process Control (APC), model-based process control, preventative operative maintenance, design optimization, updating of manufacturing parameters, updating manufacturing recipes, updating of equipment constants, feedback control, feedforward control, machine learning modification, or the like.

In some embodiments, the corrective action includes providing an alert (e.g., an alert indicating a recommended action, such as scheduling maintenance or calibration; an alarm to stop or not perform the manufacturing process if the predictive data 168 indicates a predicted abnormality, such as an abnormality of the product, a component, or manufacturing equipment 124, or the like). In some embodiments, performance of the corrective action includes causing updates to one or more equipment constants. In some embodiments performance of a corrective action may include retraining a machine learning model associated with manufacturing equipment 124. In some embodiments, performance of a corrective action may include training a new machine learning model associated with manufacturing equipment 124.

In some embodiments, the corrective action includes causing preventative operative maintenance (e.g., replace, process, clean, etc. components of the manufacturing equipment 124). In some embodiments, the corrective action includes causing design optimization (e.g., updating equipment constants, manufacturing processes, manufacturing equipment 124, etc. for an optimized product). In some embodiments, the corrective action includes a updating a recipe (e.g., altering the timing of manufacturing subsystems entering an idle or active mode, altering set points of various property values, etc.). In some embodiments, the corrective action includes scheduling or performing calibration operations, cleaning operations, and/or seasoning operations of a process system.

Predictive server 112, server machine 170, and server machine 180 may each include one or more computing devices such as a rackmount server, a router computer, a server computer, a personal computer, a mainframe computer, a laptop computer, a tablet computer, a desktop computer, Graphics Processing Unit (GPU), accelerator Application-Specific Integrated Circuit (ASIC) (e.g., Tensor Processing Unit (TPU)), etc. Operations of predictive server 112, server machine 170, server machine 180, data store 140, etc., may be performed by a cloud computing service, cloud data storage service, etc.

Predictive server 112 may include a predictive component 114. In some embodiments, the predictive component 114 may receive current sensor data 146 for performing a corrective action associated with manufacturing equipment 124. In some embodiments, the corrective action may include updating one or more equipment constants. Predictive component 114 may further receive additional data, such as current manufacturing parameters (e.g., receive from the client device 120, retrieve from the data store 140), metrology data 160, equipment constants 152, golden trace data 162, etc., to generate output (e.g., predictive data 168) for performing corrective action associated with the manufacturing equipment 124. In some embodiments, predictive component 114 may use one or more trained machine learning models 190 to determine the output for performing the corrective action based on current data. In some embodiments, predictive data 168 may be utilized as input to a machine learning model. A machine learning model may receive as input data that is output by another machine learning model.

Manufacturing equipment 124 may be associated with one or more machine leaning models, e.g., model 190. Machine learning models associated with manufacturing equipment 124 may perform many tasks, including process control, classification, performance predictions, processing updates, etc. Model 190 may be trained using data associated with manufacturing equipment 124 or products processed by manufacturing equipment 124, e.g., sensor data 142 (e.g., collected by sensors 126), manufacturing parameters 150 (e.g., associated with process control of manufacturing equipment 124), metrology data 160 (e.g., generated by metrology equipment 128), equipment constants 152, etc.

One type of machine learning model that may be used to perform some or all of the above tasks is an artificial neural network, such as a deep neural network. Artificial neural networks generally include a feature representation component with a classifier or regression layers that map features to a desired output space. A convolutional neural network (CNN), for example, hosts multiple layers of convolutional filters. Pooling is performed, and non-linearities may be addressed, at lower layers, on top of which a multi-layer perceptron is commonly appended, mapping top layer features extracted by the convolutional layers to decisions (e.g. classification outputs).

A recurrent neural network (RNN) is another type of machine learning model. A recurrent neural network model is designed to interpret a series of inputs where inputs are intrinsically related to one another, e.g., time trace data, sequential data, etc. Output of a perceptron of an RNN is fed back into the perceptron as input, to generate the next output.

Deep learning is a class of machine learning algorithms that use a cascade of multiple layers of nonlinear processing units for feature extraction and transformation. Each successive layer uses the output from the previous layer as input. Deep neural networks may learn in a supervised (e.g., classification) and/or unsupervised (e.g., pattern analysis) manner. Deep neural networks include a hierarchy of layers, where the different layers learn different levels of representations that correspond to different levels of abstraction. In deep learning, each level learns to transform its input data into a slightly more abstract and composite representation. In an image recognition application, for example, the raw input may be a matrix of pixels; the first representational layer may abstract the pixels and encode edges; the second layer may compose and encode arrangements of edges; the third layer may encode higher level shapes (e.g., teeth, lips, gums, etc.); and the fourth layer may recognize a scanning role. Notably, a deep learning process can learn which features to optimally place in which level on its own. The "deep" in "deep learning" refers to the number of layers through which the data is transformed. More precisely, deep learning systems have a substantial credit assignment path (CAP) depth. The CAP is the chain of transformations from input to output. CAPs describe potentially causal connections between input and output. For a feedforward neural network, the depth of the CAPs may be that of the network and may be the number of hidden layers plus one. For recurrent neural networks, in which a signal may propagate through a layer more than once, the CAP depth is potentially unlimited.

In some embodiments, multiple machine learning models may be utilized by system 100. A first machine learning model may be utilized (e.g., by predictive system 110) to generate golden trace data associated with a manufacturing process, a manufacturing system, a product design, a recipe, etc. The first machine learning model may be configured to receive as input metrology data and tool traces (e.g., trace sensor data). The first machine learning model may be configured to output one or more golden traces. The golden traces output may be data measured by a golden chamber. The golden traces may be associated with products that meet target performance metrics. The golden traces may include an ideal or best trace. The golden traces may include upper and lower bounds, upper and lower guardbands, control limits, average traces, median traces, or the like. A golden trace may be selected, generated, or the like, for a target outcome. For example, a manufacturing process may have several targets, such as a target energy consumption, target environmental impact, target processing rate, and target level of performance (e.g., target level of defective products). A golden trace may be selected to optimize one metric, to balance one or more metrics, to optimize one or more metrics while maintaining other metrics within a target range, or the like.

A process may include golden trace guardbands. Guardbands may represent limits of how far a trace can deviate before some action is taken. For example, trace data of a process may be considered acceptable if data points are within a range defined by guardbands, if a target portion of data points are within a guardband, if a target portion of data points are within a target value of the guardband, or the like. In some embodiments, a guardband may be generated statistically, e.g., by generating synthetic traces that include a target portion of input data. In some embodiments, a guardband may be generated by a statistical model, a machine learning model, etc. In some embodiments, a guardband may be generated from a plurality of processing runs, processing chamber, etc. In some embodiments, a minimum and maximum data value from a number of runs (e.g., a number of golden traces) may define minimum and maximum data values of a guardband. Golden traces used to define guardbands may be generated by golden chambers, golden equipment, golden tools, etc.

In some embodiments, golden traces are provided to a second machine learning model. The second machine learning model may be configured to recommend corrective actions, e.g., to client device 120, to a user, etc. The second machine learning model may be configured to enact corrective actions. The second machine learning model may be configured to recommend and/or enact a schedule of corrective actions. The second machine learning model may be configured to recommend and/or enact equipment constant updates. The second machine learning model may receive as additional input metrology data (e.g., of process chambers that may include equipment constants to be updated). The second machine learning model may receive as additional input equipment constants (e.g., of golden chambers, of chambers associated with golden trace data, of chambers that may include equipment constants that are to be updated, etc.). The second machine learning model may receive as additional input trace data (e.g., of chambers including equipment constants that are to be updated). The second machine learning model may be configured to improve operations of one or more process chambers. The second machine learning model may improve operations of one or more process chambers by recommending and/or enacting updates to equipment constants that improve substrate metrology, e.g., that increase a likelihood that a substrate processed in the process chamber meets target performance metrics. The second machine learning model may improve operations of one or more process chambers by recommending and/or enacting updates to equipment constants that improve trace data of the process chambers, e.g., that increase similarity between golden trace data and process chamber trace data.

In some embodiments, predictive component 114 receives on or more types of data, performs signal processing to break down the data into sets of current data, provides the sets of data as input to a trained model 190, and obtains outputs indicative of predictive data 168 from the trained model 190. Input data may include sensor data 142, manufacturing parameters 150, equipment constants 152, metrology data 160, golden trace data 162, predictive data 168, etc. In some embodiments, predictive data is indicative of metrology data (e.g., prediction of substrate quality). In some embodiments, predictive data is indicative of component and/or process chamber health. In some embodiments, predictive data is indicative of processing progress (e.g., utilized to end a processing operation). In some embodiments, predictive data 168 includes golden trace data. In some embodiments, predictive data 168 includes updated equipment constants. In some embodiments, predictive data 168 includes a schedule of corrective actions, e.g., a schedule for updating equipment constants.

In some embodiments, the various models discussed in connection with model 190 (e.g., supervised machine learning model, unsupervised machine learning model, etc.) may be combined in one model (e.g., an ensemble model), or may be separate models.

Data may be passed back and forth between several distinct models included in model 190, corrective action component 122, and predictive component 114. In some embodiments, some or all of these operations may instead be performed by a different device, e.g., client device 120, server machine 170, server machine 180, etc. It will be understood by one of ordinary skill in the art that variations in data flow, which components perform which processes, which models are provided with which data, and the like are within the scope of this disclosure.

Data store 140 may be a memory (e.g., random access memory), a drive (e.g., a hard drive, a flash drive), a database system, a cloud-accessible memory system, or another type of component or device capable of storing data. Data store 140 may include multiple storage components (e.g., multiple drives or multiple databases) that may span multiple computing devices (e.g., multiple server computers). The data store 140 may store sensor data 142, manufacturing parameters 150, metrology data 160, golden trace data 162, and predictive data 168.

Sensor data 142 may include historical sensor data 144 and current sensor data 146. Sensor data may include sensor data time traces over the duration of manufacturing processes, associations of data with physical sensors, preprocessed data, such as averages and composite data, and data indicative of sensor performance over time (i.e., many manufacturing processes). Manufacturing parameters 150 and metrology data 160 may contain similar features, e.g., historical metrology data and current metrology data. Historical sensor data 144, historical metrology data, and historical manufacturing parameters may be historical data (e.g., at least a portion of these data may be used for training model 190). Current sensor data 146, current metrology data, and current manufacturing parameters, may be current data (e.g., at least a portion to be input into learning model 190, subsequent to the historical data) for which predictive data 168 is to be generated (e.g., for performing corrective actions). Equipment constants 152 may include current equipment constants, historical equipment constants (e.g., for training models), expected equipment constants (e.g., scheduled updates to equipment constants), etc. Sensor data, manufacturing parameters, metrology data, etc., may include real (e.g., measured from manufacturing processes, measured from produced substrates, etc.) and synthetic (e.g., generated by a machine learning model, generated by a subject matter expert, etc.) data.

In some embodiments, predictive system 110 further includes server machine 170 and server machine 180. Server machine 170 includes a data set generator 172 that is capable of generating data sets (e.g., a set of data inputs and a set of target outputs) to train, validate, and/or test model(s) 190, including one or more machine learning models. Some operations of data set generator 172 are described in detail below with respect to FIGS. 2A-B and 4A. In some embodiments, data set generator 172 may partition the historical data (e.g., historical sensor data 144, historical manufacturing parameters, historical metrology data 164) into a training set (e.g., sixty percent of the historical data), a validating set (e.g., twenty percent of the historical data), and a testing set (e.g., twenty percent of the historical data).

In some embodiments, predictive system 110 (e.g., via predictive component 114) generates multiple sets of features. For example a first set of features may correspond to a first set of types of sensor data (e.g., from a first set of sensors, first combination of values from first set of sensors, first patterns in the values from the first set of sensors) that correspond to each of the data sets (e.g., training set, validation set, and testing set) and a second set of features may correspond to a second set of types of sensor data (e.g., from a second set of sensors different from the first set of sensors, second combination of values different from the first combination, second patterns different from the first patterns) that correspond to each of the data sets.

In some embodiments, machine learning model 190 is provided historical data as training data. In some embodiments, machine learning model 190 is provided output from another machine learning model such as predictive data 168 as training data. The type of data provided will vary depending on the intended use of the machine learning model. For example, a machine learning model may be trained by providing the model with historical sensor data 144 as training input and corresponding metrology data 160 as target output. In some embodiments, a large volume of data is used to train model 190, e.g., sensor and metrology data of hundreds of substrates may be used.

Server machine 180 includes a training engine 182, a validation engine 184, selection engine 185, and/or a testing engine 186. An engine (e.g., training engine 182, a validation engine 184, selection engine 185, and a testing engine 186) may refer to hardware (e.g., circuitry, dedicated logic, programmable logic, microcode, processing device, etc.), software (such as instructions run on a processing device, a general purpose computer system, or a dedicated machine), firmware, microcode, or a combination thereof. The training engine 182 may be capable of training a model 190 using one or more sets of features associated with the training set from data set generator 172. The training engine 182 may generate multiple trained models 190, where each trained model 190 corresponds to a distinct set of features of the training set (e.g., sensor data from a distinct set of sensors). For example, a first trained model may have been trained using all features (e.g., X1-X5), a second trained model may have been trained using a first subset of the features (e.g., X1, X2, X4), and a third trained model may have been trained using a second subset of the features (e.g., X1, X3, X4, and X5) that may partially overlap the first subset of features. Data set generator 172 may receive the output of a trained model (e.g., predictive data 168 or equipment constants to be updated), collect that data into training, validation, and testing data sets, and use the data sets to train a second model (e.g., a machine learning model configured to output predictive data, corrective actions, etc.).

Validation engine 184 may be capable of validating a trained model 190 using a corresponding set of features of the validation set from data set generator 172. For example, a first trained machine learning model 190 that was trained using a first set of features of the training set may be validated using the first set of features of the validation set. The validation engine 184 may determine an accuracy of each of the trained models 190 based on the corresponding sets of features of the validation set. Validation engine 184 may discard trained models 190 that have an accuracy that does not meet a threshold accuracy. In some embodiments, selection engine 185 may be capable of selecting one or more trained models 190 that have an accuracy that meets a threshold accuracy. In some embodiments, selection engine 185 may be capable of selecting the trained model 190 that has the highest accuracy of the trained models 190.

Testing engine 186 may be capable of testing a trained model 190 using a corresponding set of features of a testing set from data set generator 172. For example, a first trained machine learning model 190 that was trained using a first set of features of the training set may be tested using the first set of features of the testing set. Testing engine 186 may determine a trained model 190 that has the highest accuracy of all of the trained models based on the testing sets.

In the case of a machine learning model, model 190 may refer to the model artifact that is created by training engine 182 using a training set that includes data inputs and corresponding target outputs (correct answers for respective training inputs). In embodiments, the training set includes synthetic microscopy images generated by synthetic data generator 174. Patterns in the data sets can be found that map the data input to the target output (the correct answer), and machine learning model 190 is provided mappings that capture these patterns. The machine learning model 190 may use one or more of Support Vector Machine (SVM), Radial Basis Function (RBF), clustering, supervised machine learning, semi-supervised machine learning, unsupervised machine learning, k-Nearest Neighbor algorithm (k-NN), linear regression, random forest, neural network (e.g., artificial neural network, recurrent neural network), etc. Synthetic data generator 174 may include one or more machine learning models, which may include one or more of the same types of models (e.g., artificial neural network).

In some embodiments, one or more machine learning models 190 may be trained using historical data (e.g., historical sensor data 144). In some embodiments, models 190 may have been trained using synthetic data 162, or a combination of historical data and synthetic data.

Predictive component 114 may provide current data to model 190 and may run model 190 on the input to obtain one or more outputs. For example, predictive component 114 may provide current sensor data 146 to model 190 and may run model 190 on the input to obtain one or more outputs. Predictive component 114 may be capable of determining (e.g., extracting) predictive data 168 from the output of model 190. Predictive component 114 may determine (e.g., extract) confidence data from the output that indicates a level of confidence that predictive data 168 is an accurate predictor of a process associated with the input data for products produced or to be produced using the manufacturing equipment 124 at the current sensor data 146 and/or current manufacturing parameters. Predictive component 114 or corrective action component 122 may use the confidence data to decide whether to cause a corrective action associated with the manufacturing equipment 124 based on predictive data 168.

The confidence data may include or indicate a level of confidence that the predictive data 168 is an accurate prediction for products or components associated with at least a portion of the input data. In one example, the level of confidence is a real number between 0 and 1 inclusive, where 0 indicates no confidence that the predictive data 168 is an accurate prediction for products processed according to input data or component health of components of manufacturing equipment 124 and 1 indicates absolute confidence that the predictive data 168 accurately predicts properties of products processed according to input data or component health of components of manufacturing equipment 124. Responsive to the confidence data indicating a level of confidence below a threshold level for a predetermined number of instances (e.g., percentage of instances, frequency of instances, total number of instances, etc.) predictive component 114 may cause trained model 190 to be re-trained (e.g., based on current sensor data 146, current manufacturing parameters, etc.). In some embodiments, retraining may include generating one or more data sets (e.g., via data set generator 172) utilizing historical data and/or synthetic data.

For purpose of illustration, rather than limitation, aspects of the disclosure describe the training of one or more machine learning models 190 using historical data (e.g., historical sensor data 144, historical manufacturing parameters) and inputting current data (e.g., current sensor data 146, current manufacturing parameters, and current metrology data) into the one or more trained machine learning models to determine predictive data 168. In other embodiments, a heuristic model, physics-based model, or rule-based model is used to determine predictive data 168 (e.g., without using a trained machine learning model). In some embodiments, such models may be trained using historical and/or synthetic data. In some embodiments, these models may be retrained utilizing a combination of true historical data and synthetic data. Predictive component 114 may monitor historical sensor data 144, historical manufacturing parameters, and metrology data 160. Any of the information described with respect to data inputs 210A-B of FIGS. 2A-B may be monitored or otherwise used in the heuristic, physics-based, or rule-based model.

In some embodiments, the functions of client device 120, predictive server 112, server machine 170, and server machine 180 may be provided by a fewer number of machines. For example, in some embodiments server machines 170 and 180 may be integrated into a single machine, while in some other embodiments, server machine 170, server machine 180, and predictive server 112 may be integrated into a single machine. In some embodiments, client device 120 and predictive server 112 may be integrated into a single machine. In some embodiments, functions of client device 120, predictive server 112, server machine 170, server machine 180, and data store 140 may be performed by a cloud-based service.

In general, functions described in one embodiment as being performed by client device 120, predictive server 112, server machine 170, and server machine 180 can also be performed on predictive server 112 in other embodiments, if appropriate. In addition, the functionality attributed to a particular component can be performed by different or multiple components operating together. For example, in some embodiments, the predictive server 112 may determine the corrective action based on the predictive data 168. In another example, client device 120 may determine the predictive data 168 based on output from the trained machine learning model.

In addition, the functions of a particular component can be performed by different or multiple components operating together. One or more of the predictive server 112, server machine 170, or server machine 180 may be accessed as a service provided to other systems or devices through appropriate application programming interfaces (API).

In embodiments, a "user" may be represented as a single individual. However, other embodiments of the disclosure encompass a "user" being an entity controlled by a plurality of users and/or an automated source. For example, a set of individual users federated as a group of administrators may be considered a "user.", Embodiments of the disclosure may be applied to data quality evaluation, feature enhancement, model evaluation, Virtual Metrology (VM), Predictive Maintenance (PdM), limit optimization, process control, or the like.

FIGS. 2A-B depict block diagrams of example data set generators 272A-B (e.g., data set generator 172 of FIG. 1) to create data sets for training, testing, validating, etc. a model (e.g., model 190 of FIG. 1), according to some embodiments. Each data set generator 272 may be part of server machine 170 of FIG. 1. In some embodiments, several machine learning models associated with manufacturing equipment 124 may be trained, used, and maintained (e.g., within a manufacturing facility). Each machine learning model may be associated with one data set generators 272, multiple machine learning models may share a data set generator 272, etc.

FIG. 2A depicts a system 200A including data set generator 272A for creating data sets for one or more supervised models (e.g., model 190 of FIG. 1). A supervised model may be generated by providing to a model training input and target output (e.g., a correct answer) associated with the training input. Data set generator 272A may create data sets (e.g., data input 210A, target output 220A) using historical data, such as historical sensor data, historical metrology data, etc. Data set generator 272A may be utilized to generate one or more data sets for a machine learning model that is configured to recommend corrective actions. Data set generator 272A may be utilized to generate one or more data sets for a machine learning model that is configured to enact corrective actions. Data set generator 272A may be utilized to generate one or more data sets for a machine learning model that is configured to schedule updates to equipment constants of manufacturing equipment.

Data set generator 272A may generate data sets to train, test, and validate a model. In some embodiments, data set generator 272A may generate data sets for a machine learning model. In some embodiments, data set generator 272A may generate data sets for training, testing, and/or validating a machine learning model configured to schedule updates to equipment constants of manufacturing equipment. The machine learning model is provided with a set of target trace data 242A and set of historical trace data 246A as data input 210A. Target trace data may include golden trace data. Historical trace data may include data from a process chamber, e.g., a process chamber exhibiting poor performance. Poor performance may include a threshold number or portion of products that do not meet threshold quality metrics, a number or portion of equipment constants that are outliers compared to other chambers, etc. The machine learning model may be configured to recommend changes in equipment constants predicted to cause trace data of the process chamber to be more similar to target trace data as output.

In some embodiments, data set generator 272A may generate additional sets of data as part of data input 210A to provide to a model. The model may be configured to recommend changes to equipment constants based on additional data. The machine learning model may be provided with one or more sets of target metrology data. The target metrology data may be associated with the golden traces. The machine learning model may be provided with one or more sets of historical metrology data, e.g., metrology data of products associated with sets of historical trace data. The machine learning model may be provided with one or more sets of equipment constants, e.g., equipment constants to be updated, equipment constants associated with the process chambers that produced the golden trace data, etc.

Data set generator 272A may be utilized to train a machine learning model to recommend and/or schedule corrective actions. The machine learning model may be configured to adjust equipment constants of one or more process chambers. The machine learning model may be configured to adjust equipment constants to more closely resemble equipment constants of a golden chamber. The machine learning model may be configured to adjust equipment constants to enable trace data of a process chamber to more closely resemble golden trace data. The machine learning model may be configured to adjust equipment constants to enable metrology of products generated by the process chamber to more closely resemble metrology of products generated by a golden chamber.

The machine learning model may generate a schedule of equipment constant updates. The machine learning model may limit the number of updates on a process chamber, the number of updates to a tool, the number of updates in a facility, etc., performed at one time. The machine learning model may limit the number of chambers or tools updated at one time. The machine learning model may base an equipment constant update schedule on risk and effectiveness of updating equipment constants. For example, the machine learning model may prioritize equipment constant updates that are low risk (e.g., unlikely to increase production of faulty products) and likely to effectively address deficiencies of a process chamber. Risk and effectiveness may be assessed based on subject matter expertise, may be assessed by a physics-based model, may be assessed by a statistical or machine learning model, etc. The machine learning model may perform optimization operations in association with scheduling equipment constant updates. The machine learning model may optimize equipment constant updates to mitigate risk of reducing the effectiveness of a process chamber. The machine learning model may optimize equipment constant updates to increase likelihood of improving the effectiveness of a process chamber. The machine learning model may optimize equipment constant updates to achieve other goals, such as reduced energy consumption, reduced material consumption, reduced process time, etc.

Data set generator 272A may be used to generate data for any type of machine learning model, such as the machine learning architectures discussed in connection with FIG. 1.

Data set generator 272A may be used to generate data for a machine learning model that recommends equipment constant updates. Data set generator 272A may be used to generate data for a machine learning model that schedules equipment constant updates. Data set generator 272A may be used to generate data for a machine learning model that enacts equipment constant updates. Data set generator 272A may be used to generate data for a machine learning model configured to identify a product anomaly and/or processing equipment fault. For example, data set generator 272A may be used to generate data for a machine learning model configured to detect outliers in equipment constants, outliers in correlations or relationships between equipment constants, trace data, and/or metrology data, etc. Data set generator 272A may be used to generate data for a machine learning model configured to detect causal relationships, e.g., detect causes and effects for one or more metrics.

In some embodiments, data set generator 272A generates a data set (e.g., training set, validating set, testing set) that includes one or more data inputs 210A (e.g., training input, validating input, testing input). Data inputs 210A may be provided to training engine 182, validating engine 184, or testing engine 186. The data set may be used to train, validate, or test the model (e.g., model 190 of FIG. 1).

In some embodiments, data input 210A may include one or more sets of data. As an example, system 200A may produce sets of sensor data that may include one or more of sensor data from one or more types of sensors, combinations of sensor data from one or more types of sensors, patterns from sensor data from one or more types of sensors, etc.

In some embodiments, data input 210A may include one or more sets of data. As an example, system 200A may produce sets of historical metrology data that may include one or more of metrology data of a group of dimensions of a device (e.g., include thickness of the device but not optical data or surface roughness, etc.), metrology data derived from one or more types of sensors, combination of metrology data derived from one or more types of sensors, patterns from metrology data, etc. Sets of data input 210A may include data describing different aspects of manufacturing, e.g., a combination of metrology data and sensor data, a combination of metrology data and manufacturing parameters, combinations of some metrology data, some manufacturing parameter data and some sensor data, data associated with components of a manufacturing system such as part quality data, etc. Data input 210A may include measured and/or synthetic data.

In some embodiments, data set generator 272A may generate a first data input corresponding to a first set of target trace data 242A and a first set of historical trace data 246A to train, validate, or test a first machine learning model. Data set generator 272A may generate a second data input corresponding to a second set of target trace data 242B and a second set of historical trace data 246B to train, validate, or test a second machine learning model.

In some embodiments, data set generator 272A generates a data set (e.g., training set, validating set, testing set) that includes one or more data inputs 210A (e.g., training input, validating input, testing input) and may include one or more target outputs 220A that correspond to the data inputs 210A. The data set may also include mapping data that maps the data inputs 210A to the target outputs 220A. In some embodiments, data set generator 272A may generate data for training a machine learning model configured to output equipment constant updates, by generating data sets including output equipment constant data 268. Data inputs 210A may also be referred to as "features," "attributes," or "information." In some embodiments, data set generator 272A may provide the data set to training engine 182, validating engine 184, or testing engine 186, where the data set is used to train, validate, or test the machine learning model (e.g., one of the machine learning models that are included in model 190, an ensemble machine learning model, etc.).

System 200B containing data set generator 272B (e.g., data set generator 172 of FIG. 1) creates data sets for one or more machine learning models (e.g., model 190 of FIG. 1). Data set generator 272B may create data sets (e.g., data input 210B) using historical data. Example data set generator 272B is configured to generate data sets for a machine learning model configured to take as input data associated with processed products and generate as output golden trace data. Data set generator 272B may provide data sets to an unsupervised machine learning model, e.g., data set generator 272B may provide data input 210B and may not provide target output. Data set generator 272B may share one or more features and/or functions with data set generator 272A.

Data set generator 272B may generate data sets to train, test, and validate a machine learning model. The machine learning model is provided with set of golden chamber data 262A (e.g., metrology data of products processed by a golden process chamber, trace data from the processing of the products, etc.) as data input 210B. The machine learning model may include two or more separate models (e.g., the machine learning model may be an ensemble model). The machine learning model may be configured to generate output data including golden trace data. The golden trace data may include a trace to be matched by process chambers other than the golden process chambers. The golden trace data may include an upper and/or lower bound, e.g., may define a region of acceptable trace data. The golden trace data may be from a variety of processing runs, a variety of golden chambers, a variety of sensors, etc. For example, trace data from different sensors may impact metrology in different ways. Different chambers may perform differently in various metrologies, and golden trace data may reflect improved performance of one golden chamber in a particular area (e.g., a particular subsystem, such as a pressure subsystem, RF subsystem, etc.) over another golden chamber. Data set generator 272B may generate data sets to train an unsupervised machine learning model, e.g., a model configured to receive as input synthetic microscopy data and generate as output clustering data, outlier detection data, anomaly detection data, etc. The model may be trained to generate output data based on associations between sensor data and metrology data, e.g., the model may be trained to recognize how trace data from combinations of sensors are correlated to metrology data.

In some embodiments, data set generator 272B generates a data set (e.g., training set, validating set, testing set) that includes one or more data inputs 210B (e.g., training input, validating input, testing input). Data inputs 210B may also be referred to as "features," "attributes," or "information." In some embodiments, data set generator 272B may provide the data set to the training engine 182, validating engine 184, or testing engine 186, where the data set is used to train, validate, or test the machine learning model (e.g., model 190 of FIG. 1). Some embodiments of generating a training set are further described with respect to FIG. 4A.

In some embodiments, data set generator 272B may generate a first data input corresponding to a first set of golden chamber data 244A to train, validate, or test a first machine learning model and the data set generator 272A may generate a second data input corresponding to a second set of golden chamber data 244B to train, validate, or test a second machine learning model.

Data inputs 210B to train, validate, or test a machine learning model may include information for a particular manufacturing chamber (e.g., for particular substrate manufacturing equipment). In some embodiments, data inputs 210B may include information for a specific type of manufacturing equipment, e.g., manufacturing equipment sharing specific characteristics. Data inputs 210B may include data associated with a device of a certain type, e.g., intended function, design, produced with a particular recipe, etc. Training a machine learning model based on a type of equipment, device, recipe, facility, etc. may allow the trained model to generate golden trace data applicable in a number of settings (e.g., for a number of different facilities, products, etc.).

In some embodiments, subsequent to generating a data set and training, validating, or testing a machine learning model using the data set, the model may be further trained, validated, or tested, or adjusted (e.g., adjusting weights or parameters associated with input data of the model, such as connection weights in a neural network). Further training, validating, testing, or adjustment may be performed with additional data, e.g., additional training data generated by manufacturing equipment after the model was initially trained.

FIG. 3 is a block diagram illustrating system 300 for generating output data (e.g., predictive data 168 of FIG. 1), according to some embodiments. In some embodiments, a system such as system 300 may be used in conjunction with a machine learning model configured to generate golden trace data (e.g., golden trace data 162 of FIG. 1). In some embodiments, a system such as system 300 may be used in conjunction with a machine learning model to determine a corrective action associated with manufacturing equipment. In some embodiments, a system such as system 300 may be used in conjunction with a machine learning model to determine a fault of manufacturing equipment. In some embodiments, a system such as system 300 may be used in conjunction with a machine learning model to cluster or classify equipment constants of process tools or chambers. A system such as system 300 may be used in conjunction with a machine learning model to schedule updates to equipment constants of manufacturing equipment. A system such as system 300 may be used in conjunction with a machine learning model with a different function than those listed, associated with a manufacturing system.

System 300 and the accompanying description are directed to a machine learning model that receives as input data from one or more golden process chambers and data from one or more other process chambers, and generates as output recommended corrective actions to improve performance of the one or more other process chambers. The golden process chamber data may include golden trace data and golden equipment constants. The other process chamber data may include trace data and equipment constants. The input data may further include metrology data, additional chamber data, target performance data, etc. The output may further include recommended equipment constant updates, scheduled equipment constant updates, etc. Machine learning models with other functions may be operated in conjunction with a system analogous to system 300, with appropriate alterations such as the identity of input and output data.

At block 310, system 300 (e.g., components of predictive system 110 of FIG. 1) performs data partitioning (e.g., via data set generator 172 of server machine 170 of FIG. 1) of data to be used in training, validating, and/or testing a machine learning model. In some embodiments, training data 364 includes golden data, such as golden trace data, golden metrology data, golden equipment constants, etc. In some embodiments, training data 364 includes historical data, such as historical metrology data, historical equipment constant data, historical trace data, etc. Training data 364 may undergo data partitioning at block 310 to generate training set 302, validation set 304, and testing set 306. For example, the training set may be 60% of the training data, the validation set may be 20% of the training data, and the testing set may be 20% of the training data.

The generation of training set 302, validation set 304, and testing set 306 may be tailored for a particular application. For example, the training set may be 60% of the training data, the validation set may be 20% of the training data, and the testing set may be 20% of the training data. System 300 may generate a plurality of sets of features for each of the training set, the validation set, and the testing set. For example, if training data 364 includes sensor data, including features derived from sensor data from 20 sensors (e.g., sensors 126 of FIG. 1) and 10 manufacturing parameters (e.g., manufacturing parameters that correspond to the same processing runs(s) as the sensor data from the 20 sensors), the sensor data may be divided into a first set of features including sensors 1-10 and a second set of features including sensors 11-20. The manufacturing parameters may also be divided into sets, for instance a first set of manufacturing parameters including parameters 1-5, and a second set of manufacturing parameters including parameters 6-10. Either training input, target output, both, or neither may be divided into sets. Multiple models may be trained on different sets of data.

At block 312, system 300 performs model training (e.g., via training engine 182 of FIG. 1) using training set 302. Training of a machine learning model and/or of a physics-based model (e.g., a digital twin) may be achieved in a supervised learning manner, which involves providing a training dataset including labeled inputs through the model, observing its outputs, defining an error (by measuring the difference between the outputs and the label values), and using techniques such as gradient descent and backpropagation to tune the weights of the model such that the error is minimized. In many applications, repeating this process across the many labeled inputs in the training dataset yields a model that can produce correct output when presented with inputs that are different than the ones present in the training dataset. In some embodiments, training of a machine learning model may be achieved in an unsupervised manner, e.g., labels or classifications may not be supplied during training. An unsupervised model may be configured to perform anomaly detection, result clustering, etc. In some embodiments, generation of golden trace data may be performed by an unsupervised machine learning model, e.g., by determining a correlation between various traces and metrology metrics, and determining a range of trace data that is likely to result in acceptable metrology and/or performance of a substrate.

For each training data item in the training dataset, the training data item may be input into the model (e.g., into the machine learning model). The model may then process the input training data item (e.g., a number of measured dimensions of a manufactured device, a cartoon picture of a manufactured device, etc.) to generate an output. The output may include, for example, a corrective action. The output may be compared to a label of the training data item (e.g., a corrective action taken to correct a problem associated with the historical data). In some embodiments, an unsupervised model may be utilized to recommend corrective actions, e.g., an unsupervised model may learn a relationship between equipment constants and substrate performance, and provide updates to equipment constants predicted to improve substrate performance.

Processing logic may then compare the generated output (e.g., recommended corrective action) to the label (e.g., actual corrective action) that was included in the training data item. Processing logic determines an error (i.e., a classification error) based on the differences between the output and the label(s). Processing logic adjusts one or more weights and/or values of the model based on the error.

In the case of training a neural network, an error term or delta may be determined for each node in the artificial neural network. Based on this error, the artificial neural network adjusts one or more of its parameters for one or more of its nodes (the weights for one or more inputs of a node). Parameters may be updated in a back propagation manner, such that nodes at a highest layer are updated first, followed by nodes at a next layer, and so on. An artificial neural network contains multiple layers of "neurons", where each layer receives as input values from neurons at a previous layer. The parameters for each neuron include weights associated with the values that are received from each of the neurons at a previous layer. Accordingly, adjusting the parameters may include adjusting the weights assigned to each of the inputs for one or more neurons at one or more layers in the artificial neural network.

One or more operations of system 300 may be performed by a statistical model. A statistical model may utilize input data to determine output data via one or more statistical operations. Operations of system 300 may be performed by a heuristic or rule-based model.

System 300 may train multiple models using multiple sets of features of the training set 302 (e.g., a first set of features of the training set 302, a second set of features of the training set 302, etc.). For example, system 300 may train a model to generate a first trained model using the first set of features in the training set (e.g., sensor data from sensors 1-10, metrology measurements 1-10, etc.) and to generate a second trained model using the second set of features in the training set (e.g., sensor data from sensors 11-20, metrology measurements 11-20, etc.). In some embodiments, the first trained model and the second trained model may be combined to generate a third trained model (e.g., which may be a better predictor or synthetic data generator than the first or the second trained model on its own). In some embodiments, sets of features used in comparing models may overlap (e.g., first set of features being sensor data from sensors 1-15 and second set of features being sensors 5-20). In some embodiments, hundreds of models may be generated including models with various permutations of features and combinations of models.

At block 314, system 300 performs model validation (e.g., via validation engine 184 of FIG. 1) using the validation set 304. The system 300 may validate each of the trained models using a corresponding set of features of the validation set 304. For example, system 300 may validate the first trained model using the first set of features in the validation set (e.g., sensor data from sensors 1-10 or metrology measurements 1-10) and the second trained model using the second set of features in the validation set (e.g., sensor data from sensors 11-20 or metrology measurements 11-20). In some embodiments, system 300 may validate hundreds of models (e.g., models with various permutations of features, combinations of models, etc.) generated at block 312. At block 314, system

300 may determine an accuracy of each of the one or more trained models (e.g., via model validation) and may determine whether one or more of the trained models has an accuracy that meets a threshold accuracy. Responsive to determining that none of the trained models has an accuracy that meets a threshold accuracy, flow returns to block 312 where the system 300 performs model training using different sets of features of the training set. Responsive to determining that one or more of the trained models has an accuracy that meets a threshold accuracy, flow continues to block 316. System 300 may discard the trained models that have an accuracy that is below the threshold accuracy (e.g., based on the validation set).

At block 316, system 300 performs model selection (e.g., via selection engine 185 of FIG. 1) to determine which of the one or more trained models that meet the threshold accuracy has the highest accuracy (e.g., the selected model 308, based on the validating of block 314). Responsive to determining that two or more of the trained models that meet the threshold accuracy have the same accuracy, flow may return to block 312 where the system 300 performs model training using further refined training sets corresponding to further refined sets of features for determining a trained model that has the highest accuracy.

At block 318, system 300 performs model testing (e.g., via testing engine 186 of FIG. 1) using testing set 306 to test selected model 308. System 300 may test, using the first set of features in the testing set (e.g., sensor data from sensors 1-10), the first trained model to determine the first trained model meets a threshold accuracy (e.g., based on the first set of features of the testing set 306). Responsive to accuracy of the selected model 308 not meeting the threshold accuracy (e.g., the selected model 308 is overly fit to the training set 302 and/or validation set 304 and is not applicable to other data sets such as the testing set 306), flow continues to block 312 where system 300 performs model training (e.g., retraining) using different training sets corresponding to different sets of features (e.g., sensor data from different sensors). Responsive to determining that selected model 308 has an accuracy that meets a threshold accuracy based on testing set 306, flow continues to block 320. In at least block 312, the model may learn patterns in the training data to make predictions or generate a schedule of updating equipment constants, and in block 318, the system 300 may apply the model on the remaining data (e.g., testing set 306) to test the predictions.

At block 320, system 300 uses the trained model (e.g., selected model 308) to receive current data 322 (e.g., current trace data associated with a recently processed substrate, current equipment constants of a process chamber, etc.) and determines (e.g., extracts), from the output of the trained model, equipment constant data 324 (e.g., predictive data 168 of FIG. 1). A corrective action associated with the manufacturing equipment 124 of FIG. 1 may be performed in view of equipment constant data 324. In some embodiments, current data 322 may correspond to the same types of features in the historical data used to train the machine learning model. In some embodiments, current data 322 corresponds to a subset of the types of features in historical data that are used to train selected model 308 (e.g., a machine learning model may be trained using a number of metrology measurements, and configured to generate output based on a subset of metrology measurements).

In some embodiments, the performance of a machine learning model trained, validated, and tested by system 300 may deteriorate. For example, a manufacturing system associated with the trained machine learning model may undergo a gradual change or a sudden change. A change in the manufacturing system may result in decreased performance of the trained machine learning model. A new model may be generated to replace the machine learning model with decreased performance. The new model may be generated by altering the old model by retraining, by generating a new model, etc.

In some embodiments, one or more of the acts 310-320 may occur in various orders and/or with other acts not presented and described herein. In some embodiments, one or more of acts 310-320 may not be performed. For example, in some embodiments, one or more of data partitioning of block 310, model validation of block 314, model selection of block 316, or model testing of block 318 may not be performed.

FIG. 3 depicts a system configured for training, validating, testing, and using one or more machine learning models. The machine learning models are configured to accept data as input (e.g., set points provided to manufacturing equipment, sensor data, metrology data, etc.) and provide data as output (e.g., predictive data, corrective action data, classification data, etc.). Input and/or output data may be processed, feature extracted, formatted for convenience for the model or for ease of interpretation, or the like. Partitioning, training, validating, selection, testing, and using blocks of system 300 may be executed similarly to train a second model, utilizing different types of data. Retraining may also be done, utilizing current data 322 and/or additional training data 346.

Figures 4A, 4B:
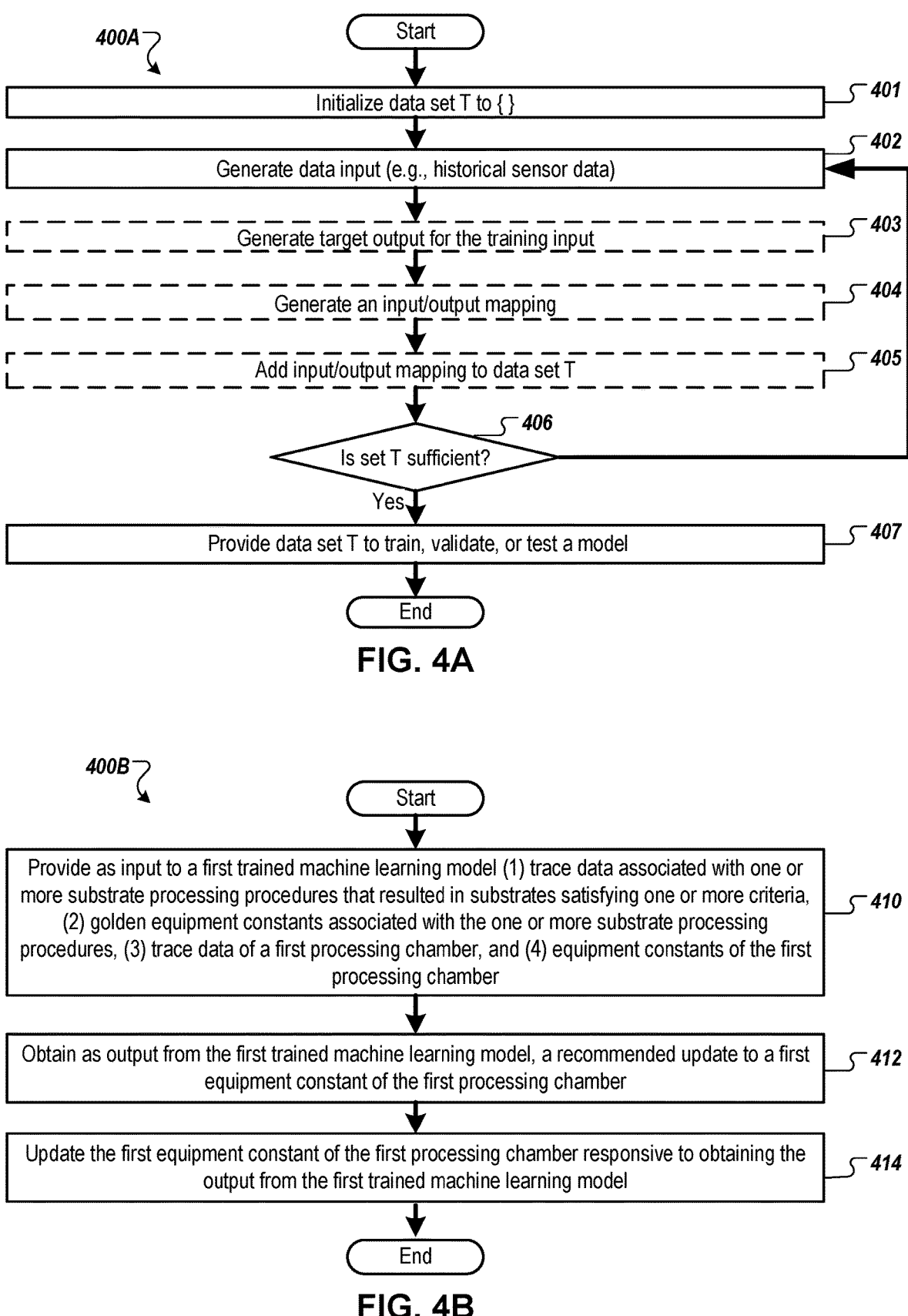
FIG. 4A is a flow diagrams of a method of generating data sets for a machine learning model, according to some embodiments.
FIG. 4B is a flow diagram of a method of updating equipment constants of a process chamber, according to some embodiments.

FIGS. 4A-C are flow diagrams of methods 400A-C associated with training and utilizing models, according to certain embodiments. Methods 400A-C may include training and utilizing machine learning models, statistical models, rule-based models, heuristic models, physics-based models, etc. Methods 400A-C may be associated with recommending and/or implementing corrective actions. Methods 400A-C may be associated with updating equipment constants of one or more processing chambers. Methods 400A-C may be performed by processing logic that may include hardware (e.g., circuitry, dedicated logic, programmable logic, microcode, processing device, etc.), software (such as instructions run on a processing device, a general purpose computer system, or a dedicated machine), firmware, microcode, or a combination thereof. In some embodiment, methods 400A-C may be performed, in part, by predictive system 110. Method 400A may be performed, in part, by predictive system 110 (e.g., server machine 170 and data set generator 172 of FIG. 1, data set generators 272A-B of FIGS. 2A-B). Predictive system 110 may use method 400A to generate a data set to at least one of train, validate, or test a machine learning model, in accordance with embodiments of the disclosure. Methods 400B-C may be performed by predictive server 112 (e.g., predictive component 114) and/or server machine 180 (e.g., training, validating, and testing operations may be performed by server machine 180). In some embodiments, a non-transitory machine-readable storage medium stores instructions that when executed by a processing device (e.g., of predictive system 110, of server machine 180, of predictive server 112, etc.) cause the processing device to perform one or more of methods 400A-C.

For simplicity of explanation, methods 400A-C are depicted and described as a series of operations. However, operations in accordance with this disclosure can occur in various orders and/or concurrently and with other operations not presented and described herein. Furthermore, not all illustrated operations may be performed to implement methods 400A-C in accordance with the disclosed subject matter. In addition, those skilled in the art will understand and appreciate that methods 400A-C could alternatively be represented as a series of interrelated states via a state diagram or events.

FIG. 4A is a flow diagram of a method 400A for generating a data set for a machine learning model, according to some embodiments. Referring to FIG. 4A, in some embodiments, at block 401 the processing logic implementing method 400A initializes a training set T to an empty set.

At block 402, processing logic generates first data input (e.g., first training input, first validating input) that may include one or more of sensor, manufacturing parameters, metrology data, etc. In some embodiments, the first data input may include a first set of features for types of data and a second data input may include a second set of features for types of data (e.g., as described with respect to FIG. 3). Input data may include historical data.

In some embodiments, at block 403, processing logic optionally generates a first target output for one or more of the data inputs (e.g., first data input). In some embodiments, the input includes one or more golden traces and the target output includes recommended updates to equipment constants. In some embodiments, the input further includes additional data, such as metrology data, process chamber equipment constants, and/or process chamber trace data, and the target output includes a recommended schedule of equipment constant updates. In some embodiments, no target output is generated (e.g., an unsupervised machine learning model capable of grouping or finding correlations in input data, rather than being provided with target output).

At block 404, processing logic optionally generates mapping data that is indicative of an input/output mapping. The input/output mapping (or mapping data) may refer to the data input (e.g., one or more of the data inputs described herein), the target output for the data input, and an association between the data input(s) and the target output. In some embodiments, such as in association with machine learning models where no target output is provided, block 404 may not be executed.

At block 405, processing logic adds the mapping data generated at block 404 to data set T, in some embodiments.

At block 406, processing logic branches based on whether data set T is sufficient for at least one of training, validating, and/or testing a machine learning model, such as model 190 of FIG. 1. If data set T is sufficient, execution proceeds to block 407; otherwise, execution continues back at block 402. It should be noted that in some embodiments, the sufficiency of data set T may be determined based simply on the number of inputs, mapped in some embodiments to outputs, in the data set, while in some other embodiments, the sufficiency of data set T may be determined based on one or more other criteria (e.g., a measure of diversity of the data examples, accuracy, etc.) in addition to, or instead of, the number of inputs.

At block 407, processing logic provides data set T (e.g., to server machine 180) to train, validate, and/or test machine learning model 190. In some embodiments, data set T is a training set and is provided to training engine 182 of server machine 180 to perform the training. In some embodiments, data set T is a validation set and is provided to validation engine 184 of server machine 180 to perform the validating. In some embodiments, data set T is a testing set and is provided to testing engine 186 of server machine 180 to perform the testing. In the case of a neural network, for example, input values of a given input/output mapping (e.g., numerical values associated with data inputs 210A) are input to the neural network, and output values (e.g., numerical values associated with target outputs 220A) of the input/output mapping are stored in the output nodes of the neural network. The connection weights in the neural network are then adjusted in accordance with a learning algorithm (e.g., back propagation, etc.), and the procedure is repeated for the other input/output mappings in data set T. After block 407, a model (e.g., model 190) can be at least one of trained using training engine 182 of server machine 180, validated using validating engine 184 of server machine 180, or tested using testing engine 186 of server machine 180. The trained model may be implemented by predictive component 114 (of predictive server 112) to generate predictive data 168 for performing signal processing, to generate golden trace data, or for performing a corrective action associated with manufacturing equipment 124.

FIG. 4B is a flow diagram of a method 400B for updating equipment constants of a process chamber, according to some embodiments. At block 410, data is provided as input to a first trained machine learning model. The data provided includes trace data. The trace data may be golden trace data. The trace data may be associated with substrates, substrate processing procedures, etc. The trace data may be associated with substrate processing procedures that resulted in substrates satisfying one or more criteria. The trace data may be associated with substrate processing procedures that resulted in substrates meeting one or more performance thresholds. The data provided as input includes golden equipment constants. The data provided includes trace data of a first processing chamber. The data provided as input includes equipment constants of the first processing chamber.

In some embodiments, the first trained machine learning model may be provided with additional input data. The first trained machine learning model may be provided with metrology data. The metrology data may include golden metrology data, metrology data associated with the golden traces data, metrology data associated with the first processing chamber, etc. The first trained machine learning model may be configured to recommend adjustments to manufacturing equipment to increase the resemblance between acceptable metrology data or golden metrology data and current metrology data. The first trained machine learning model may be configured to adjust equipment constants to increase resemblance between substrates processed by one or more golden process chambers and a substrate processed by the first processing chamber. The first trained machine learning model may be configured to adjust equipment constants to increase resemblance between trace data from the first processing chamber and golden trace data. In some embodiments, the first trained machine learning model is configured to adjust equipment constants of the first processing chamber to target trace data that is within limits defined by the golden trace data. For example, the golden trace data may define an upper golden trace limit and a lower golden trace limit, and the machine learning model may recommend equipment constant updates to increase a likelihood that the first processing chamber generates trace data within the golden trace limits.

In some embodiments, the golden trace data may be provided to the first trained machine learning model by a second trained machine learning model. The second trained machine learning model may be configured to generate one or more sets of golden trace data. Golden trace data may include data associated with a single substrate. Golden trace data may include data associated with multiple substrates. Golden trace data may include data from a single chamber (e.g., a single golden chamber). Golden trace data may include data form multiple process chambers.

In some embodiments, the second trained machine learning model may be provided with metrology data as input. The metrology data may be associated with acceptable products, e.g., products meeting one or more performance value thresholds. The metrology data may be associated with golden process chambers, e.g., metrology of substrates processed by golden chambers. The second trained machine learning model may further be provided with trace data as input. The trace data input may be trace data associated with the metrology data, e.g., trace sensor data collected while processing the substrates that are associated with the input metrology data. The trace data input may be trace data of one or more golden chambers. The second machine learning model may be configured to generate golden traces according to one or more criteria. Golden trace data may be associated with one or more substrates that satisfy one or more criteria, one or more performance thresholds, or the like. For example, the second machine learning model may be configured to select golden trace data based on a likelihood of a process indicated by the trace data producing a substrate meeting one or more performance thresholds. The second machine learning model may generate mappings between trace data and metrology values. The second trained machine learning model may generate mappings between trace data and substrate performance. The second trained machine learning model may leverage the mappings to generate upper and lower golden trace data.

The golden trace data may be selected to correspond to an upper and lower limit of trace data values that correspond to a target likelihood of a substrate meeting one or more performance thresholds. An upper golden trace may include the highest trace values of a plurality of input trace data, e.g., the highest trace values that correspond to an acceptable end product. The upper limit golden trace may include a statistical upper bound of a plurality of traces, e.g., based on a quartile or standard deviation analysis. The lower limit trace data may be selected in a similar way to the upper limit trace data. The upper and lower limits may generate a guardband of the golden trace data. The second trained machine learning model may order a plurality of trace data, e.g., organize the plurality from lowest to highest. The second trained machine learning model may base the order on average value, median value, difference at each time step from an average value of multiple traces at that time step, or another metric. The second trained machine learning model may be configured to generate golden trace data according to one or more configuration settings. For example, the second trained machine learning model may be configured to be sensitive to a particular substrate defect, and may generate upper and lower golden trace data limits to avoid generation of substrates that include the target defect.

In some embodiments, the second trained machine learning model may be provided with additional data after training operations. The second trained machine learning model may be retrained with additional data (e.g., data associated with substrates processed after the initial training operations). The second trained machine learning model may be provided with input data, and may adjust one or more weights or biases (e.g., retrain) based on the input data. The second trained machine learning model may weight more recent data (e.g., data associated with more recently generated substrates) more highly than less recent data. The second trained machine learning model may weight more recent data more heavily than less recent data.

At block 412, processing logic obtains as output from the first trained machine learning model a recommended update to a first equipment constant of the first processing chamber. The processing logic may obtain multiple recommended updates to multiple equipment constants of the first processing chamber. The processing logic may further obtain one or more recommended updates to equipment constants of a second processing chamber. Processing logic may receive a schedule of recommended updates, e.g., processing logic may receive an order by which to update the equipment constants.

At block 414, processing logic updates the first equipment constant of the first processing chamber responsive to obtaining the output from the first trained machine learning model. Updating the equipment constant may include altering a value associated with operation of the first processing chamber. Updating the equipment constant may include scheduling maintenance, e.g., a calibration operation. Updating the equipment constant may include initiating a maintenance operation, e.g., a calibration operation.

FIG. 4C is a flow diagram of a method 400C for performing a corrective action associated with a processing chamber, according to some embodiments. At block 420, a processing device (e.g., processing logic) receives first trace data associated with a first processing chamber. The first processing chamber satisfies one or more performance metrics. The first processing chamber may be a golden chamber. The first trace data may be or include golden trace data. The first trace data and/or first processing chamber may be associated with one or more processing operations that satisfy one or more conditions. The first trace data and/or first processing chamber may be associated with one or more processing operations that resulted in substrates satisfying performance metrics.

Processing logic may further receive first metrology data of a first substrate. The first substrate may be associated with the first trace data. The first substrate may satisfy one or more performance metrics. The first substrate may be a part of a set of substrates with acceptable properties, e.g., the first substrate may be correlated to a designation of the first processing chamber as a golden chamber. Processing logic may further receive a first set of equipment constants associated with the first processing chamber.

At block 422, processing logic generates target trace data based on the first trace data associated with the first processing chamber. Target trace data may be or include golden trace data. Target trace data may include upper and lower limits. Target trace data may include guardbands. Target trace data may be generated based on multiple sets of trace data. Target trace data may be generated based on data from multiple processing chambers. Target trace data may be generated based on data associated with multiple substrates. Target trace data may comprise and/or define a range of trace data values. Target trace data may comprise and/or define a range of trace data values that satisfy one or more performance metrics. Target trace data may comprise and/or define a range of trace data values likely to be associated with manufacturing processes that satisfy one or more performance metrics.

At block 424, processing logic receives second trace data associated with a second processing chamber. The second processing chamber does not satisfy the one or more performance metrics. The second processing chamber may not be performing at a target level, e.g., of energy efficiency, time efficiency, target level of environmental impact, target profitability, or the like. Processing logic may further receive second metrology data of a second substrate associated with the second trace data. Processing logic may further receive a second set of equipment constants associated with the second processing chamber. Processing logic may further receive third trace data associated with a third processing chamber. The third trace data and third processing chamber may share one or more features with the second trace data and the second processing chamber. The third processing chamber may not satisfy the same set of performance metrics that the second processing chamber doesn't satisfy. The third processing chamber may not satisfy a different set of performance metrics than the second processing chamber doesn't satisfy.

At block 426, processing logic generates a first recommended corrective action associated with the second processing chamber. The first recommended corrective action is generated based on the target trace data and the second trace data. The first recommended corrective action includes updating one or more equipment constants of the second processing chamber. The first recommended corrective action may be generated responsive to the second trace data differing from the target trace data. The first recommended corrective action may be generated responsive to the second trace data differing by a target value, target proportion, or the like, from target trace data. The first recommended corrective action may be generated responsive to the second trace data including values (e.g., a target number of values) outside an acceptable range. The acceptable range may be defined by the target trace data, may include the target trace data, may be based on the target trace data, etc.

Generating the first recommended corrective action may be performed in further view of metrology data, e.g., metrology data of the first substrate and the second substrate. Generating the first recommended corrective action may be performed in further view of equipment constants, e.g., the first set of equipment constants and the second set of equipment constants. Generating the first recommended corrective action may be performed as part of generating a plurality of recommended corrective actions. The plurality of actions may include actions directed at one or more optimization goals (e.g., minimizing environmental impact, maximizing process throughput, etc.). The plurality of actions may include updates to multiple equipment constants. The plurality of actions may include actions directed at a plurality of processing chambers. Generating the first recommended corrective action may include generating a schedule for implements two or more recommended corrective actions. Corrective actions may be scheduled subject to updates. Corrective actions may be scheduled such that one or more manufacturing processes occur between updates, e.g., to monitor differences in processing chamber performance due to a first update before performing a second update. Corrective actions may be scheduled such that at least one substrate is processed by a processing chamber between corrective actions associated with the processing chamber. Corrective actions may be scheduled such that at least one substrate is processed by a processing chamber between updates to equipment constants of the processing chamber. The plurality of corrective actions may include corrective actions directed at a plurality of processing chambers, e.g., one or more corrective actions associated with the second processing chamber and one or more corrective actions associated with a third processing chamber. The corrective actions may be utilized in causing a fleet of processing chambers to be uniform, to perform according to one or more performance metrics, or the like.

Generating the first recommended corrective action may be performed by a trained model. Generating the first recommended corrective action may be performed by a plurality of models, an ensemble model, etc. Generating the first recommended corrective action may include operations performed by one or more statistical models, one or more rule-based models, one or more heuristic models, one or more machine leaning models, etc.

Generating the first recommended corrective action (e.g., as part of a plurality of recommended corrective actions) may include providing the target trace data and the second trace data to a trained model (e.g., a trained machine learning model, an ensemble model, etc.). Generating the first recommended corrective action may further include receiving output from the trained model. The output may be indicative of one or more recommended corrective actions (e.g., including the first recommended corrective action). Generating the first recommended corrective action may further include scheduling performance of the first recommended corrective action.

At block 428, processing logic performs the first recommended corrective action.

FIG. 4D is a flow diagram of a method for adjusting equipment constants of chambers of a fleet of chambers, according to some embodiments. At block 430, a processing device receives data indicative of performance of a plurality of process chambers. The plurality of process chambers may be a fleet of process chambers. The plurality of process chambers may be of one or more processing tools. The plurality of process chambers may be included in one or more facilities, fabrications facilities, or the like. The processing device may be a central server, e.g., associated with a fabrication facility.

At block 432, processing logic provides the data indicative of performance of the plurality of process chambers to a model. The model may be a trained machine learning model. The model may be a statistical model, rules-based model, heuristic model, physics-based model, or the like. The model may be an ensemble model, e.g., may include one or more individual models, one or more trained machine learning models, a number of types of models, or the like. The model may recommend corrective actions. The model may recommend equipment constant updates. The model may recommend a schedule for performing equipment constant updates and/or corrective actions. The model may update a previous schedule for performing corrective actions.

The data indicative of performance of the plurality of process chambers may include trace data. The data indicative of performance of the plurality of process chambers may include metrology data. The data indicative of performance of the plurality of process chambers may include metrology data of substrates manufactured in the process chambers of the plurality of process chambers.

The data indicative of performance of the plurality of process chambers may include data associated with each of the plurality of chambers. One or more chambers may be determined to be performing in a satisfactory manner. One or more chambers may be determined to be satisfying one or more performance metrics. One or more chambers may be determined to satisfy one or more performance metric thresholds. Performance metrics may include trace data metrics, metrology metrics, energy usage metrics, environmental impact metrics, etc. One or more chambers satisfying performance metrics may be designated golden chambers. One or more chambers satisfying performance metrics may be designated as golden chambers in associated with those metrics. For example, a chamber satisfying performance metrics associated with a gas flow system may be designated a golden chamber for gas flow system metrics. Trace data from one or more chambers satisfying performance metrics may be designated as golden trace data. Trace data from one or more chambers satisfying performance metrics may be used to generate golden trace data. Golden trace data may be associated with a standard of performance, e.g., a level of performance a chamber is to meet. A standard of performance may include target metrology data, a range of target metrology data, etc. A standard of performance may include target trace data, golden trace data, a range of trace data, etc. Data associated with one or more chambers satisfying performance metrics may be used to generate one or more standards of performance. Chambers may be considered to be operating acceptably if chamber performance satisfies the one or more standards of performance. Chambers may have corrective actions performed in association with the chambers in response to chamber performance not satisfying standards of performance. A process chamber may trigger a corrective action if performance of the process chamber does not meet standards associated with a golden chamber. A process chamber may trigger a recommended corrective action if data indicating performance of the process chamber (e.g., trace data, metrology data) does not satisfy one or more performance criteria. A corrective action may be recommended and/or performed in association with a process chamber if performance of the process chamber differs from performance standards, differs from performance of a target chamber, differs from performance of a golden chamber, or the like. A corrective action may target one or more differences in performance of a process chamber and performance metrics, performance standards, performance of another process chamber, or the like. A corrective action may target reducing one or more differences between performance of two process chambers, between performance metrics of a process chamber and performance standards, or the like.

At block 434, processing logic receives output from the model. The output includes a first recommended equipment constant update associated with a first process chamber of the plurality of process chambers. The output further includes a second recommended equipment constant update associated with a second process chamber of the plurality of process chambers.

At block 436, processing logic updates a first equipment constant of the first process chamber. The processing logic further updates a second equipment constant of the second process chamber. Updating the first and second equipment constants are performed in view of the first recommended equipment constant update and the second recommended equipment constant update. In some embodiments, the first equipment constant and the second equipment constant may be the same constant for different process chambers. For example, the same calibration table associated with a particular system, subsystem, or chamber component may be updated for two process chambers. The updates may be the same or different for the process chambers. In some embodiments, the first equipment constant and the second equipment constant may be associated with different equipment constants, such as constants that are associated with different operations, properties, systems, and/or components of the process chambers.

Figure 4E:
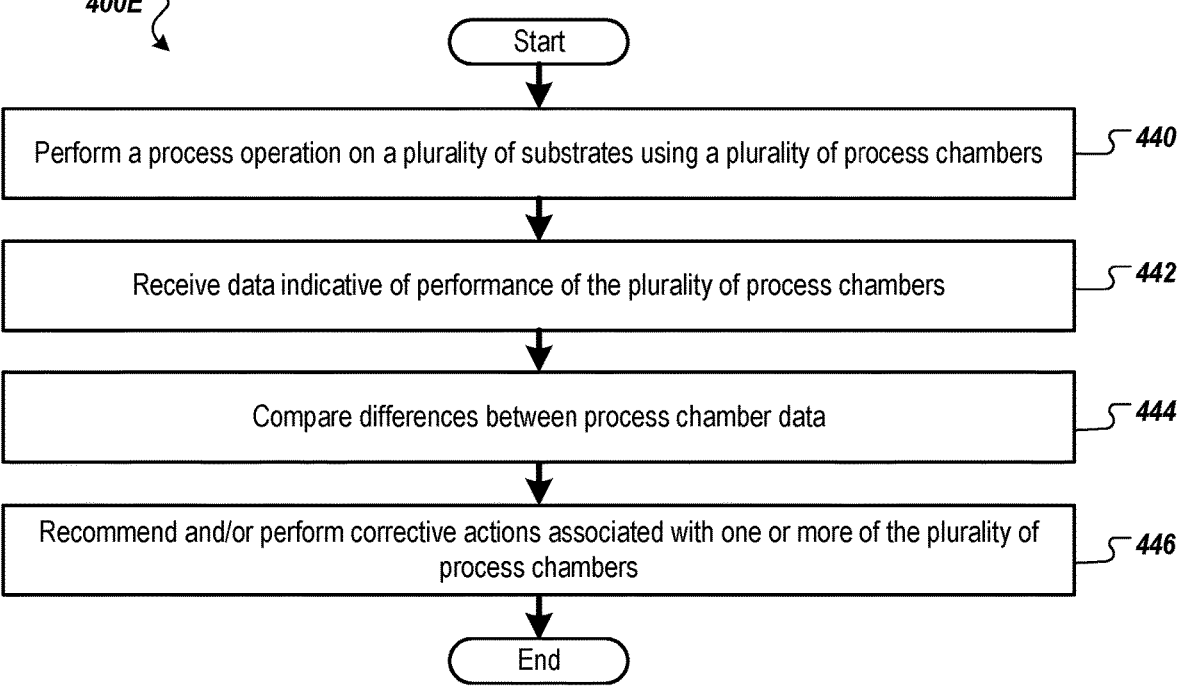
FIG. 4E is a flow diagram of an example method for performing corrective actions associated with one or more chambers of a fleet of chambers, according to some embodiments.

FIG. 4E is a flow diagram of an example method 400E for performing corrective actions associated with one or more chambers of a fleet of chambers, according to some embodiments. FIG. 4E and the associated description is meant to be illustrative, providing additional clarity of an example application in association with the present disclosure, and not restrictive.

At block 440, a process operation is performed on a plurality of substrates using a plurality of process chambers. The process chambers may be a fleet of chambers. The process operation may be one or multiple process steps, may include multiple sub-operations, etc. The process operation may include processing performed in one or more process chambers, one or more types of process chambers, etc. In some embodiments, a target process operation may include processing performed between a substrate being introduced to a chamber and removed from the chamber. The process operation may be a small portion of total processing to manufacture a substrate.

At block 442, data indicative of performance of the plurality of process chambers is received. The data may include trace data. The data may include metrology data. The data may include recipe data. The data may include equipment constants. The data may be used to identify one or more chambers that satisfy performance metrics, such as metrology metrics of products or trace data metrics. The data may be used to identify one or more golden chambers in connection with the target process operation. The data may be used to generate golden trace data. The data may be analyzed to standardize performance across a fleet of chambers, improve performance of a fleet of chambers, adjust performance goals and/or metrics of chambers, or the like. Data may be analyzed to determine chamber outliers. Data may be analyzed to determine that one or more chambers are outliers in terms of performance, equipment constants, etc.

At block 444, differences between data associated with various process chambers are compared. For example, differences in trace data, metrology data, equipment constant data, or the like may be considered. An impact of differences in data may be determined. Differences in metrology data may be related to differences in trace data. Differences in metrology and/or trace data may be related and/or alleviated by differences in equipment constants or recipes. Determining correlations between equipment constants, recipes, trace data, and metrology data may be performed by a model. Determining correlations between data may be based on subject matter expertise. Determining correlations between data may be performed by a trained machine learning model. For example, one chamber may produce substrates with one or more properties indicative of non-ideal performance of a pressure system, and another chamber may produce substrates with properties indicative of non-ideal performance of a radio frequency (RF) system. Associated equipment constants may be updated to alter/improve performance of chambers of the plurality of process chambers.

At block 446, corrective actions may be recommended and/or performed. Corrective actions may be associated with one or more of the plurality of process chambers. Corrective actions may include updating equipment constants of one or more process chambers. Equipment constants may be updated to reduce differences between chamber performance of multiple chambers of a fleet of chambers. Equipment constants may be updated to reduce differences between metrology data of processed substrates associated with different chambers. Equipment constants may be updated to reduce differences between trace data associated with different chambers. Equipment constants may be updated to different values for different chambers, e.g., based on chamber performance. Equipment constants may be updated to different values for different chambers due to subtle differences between chambers, such as aging components, manufacturing differences of components (e.g., within manufacturing tolerances), or the like. Equipment constant updates may be scheduled, e.g., lowest risk changes may be made first, changes most likely to be effective may be made first, changes may be spaced over time to allow substrates to be processed and data associated with those substrates analyzed between equipment constant updates, etc. Corrective actions may target outliers. Corrective actions may target chambers that are outliers in terms of performance, equipment constants, or the like.

Figure 5A:
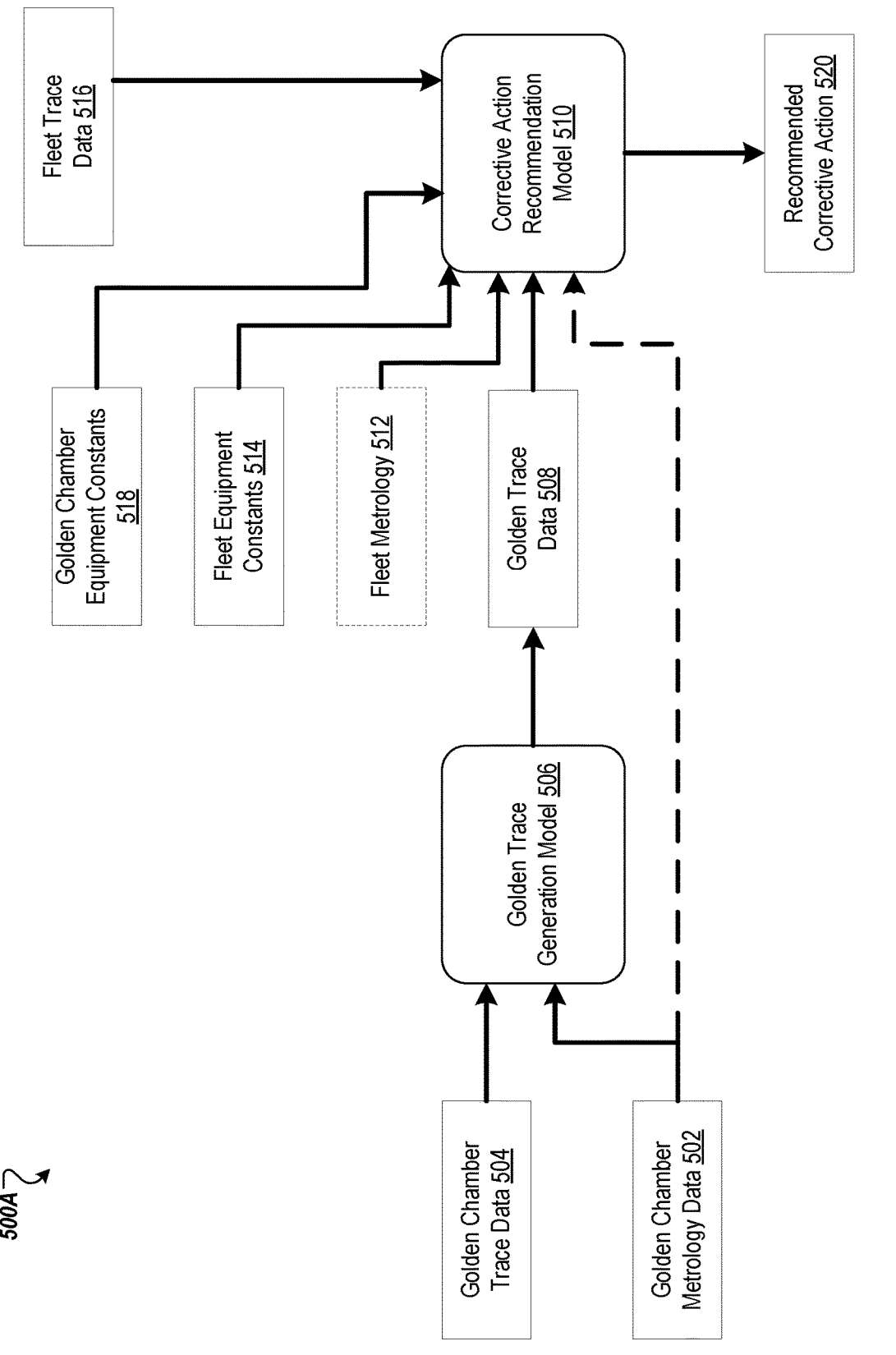
FIG. 5A is a block diagram depicting a system for performing operations associated with updating equipment constants of a process chamber, according to some embodiments

FIG. 5A is a block diagram depicting a system 500A for performing operations associated with updating equipment constants of a process chamber, according to some embodiments. System 500A is an example system, and other systems including different data flow will be recognized as being within the scope of this disclosure. System 500A includes two trained machine learning models. System 500A includes golden trace generation model 506 and corrective action recommendation model 510. In some embodiments, operations of one or both of these models may be performed by a physics-based model, statistical model, rule-based model, or the like. Operations of the models of system 500A may be performed by more or fewer models. For example, golden trace generation model 506 and corrective action recommendation model 510 may be combined into a single ensemble model.

Golden chamber trace data 504 and golden chamber metrology data 502 are provided to golden trace generation model 506. Golden chamber trace data 504 and golden chamber metrology data 502 may be associated with one or more golden chambers. A golden chamber may be a chamber that generated acceptable products, e.g., products meeting performance thresholds. A golden chamber may be a chamber that met performance thresholds for a period of time, and golden data from the chamber may be from the period when the chamber met performance thresholds. A golden chamber may be a chamber that met performance thresholds with a target likelihood, e.g., a target proportion of substrates processed by the chamber meet performance thresholds. Golden chamber trace data 504 may include trace data from a golden chamber, trace data from a golden chamber while the golden chamber was processing a product meeting performance thresholds, or the like. Golden chamber metrology data 502 may include metrology data of products processed by the golden chamber. Golden chamber metrology data 502 may include metrology data of products that meet performance thresholds. Golden chamber metrology data 502 and golden chamber trace data 504 may be associated with the same set of products. Golden trace generation model 506 may be or include a machine learning model. Golden trace generation model 506 may be or include a physics-based model. Golden trace generation model 506 may be or include a heuristic model. Golden trace generation model 506 may be or include a rule-based model. Golden trace generation model 506 may be or include a statistical model.

Golden trace generation model 506 may be configured to generate golden trace data 508. Golden trace data 508 may include data associated with one or more processed products. Golden trace data 508 may include data associated with one or more sensors of manufacturing equipment. Golden trace data 508 may include a single trace for a sensor, e.g., golden trace data 508 may indicate an "ideal" or "best" trace from the provided golden chamber trace data 504. Golden trace data 508 may include multiple traces for a sensor, e.g., golden trace data 508 may include an upper and lower golden trace. Trace data (e.g., from other process chambers)

that stays within the bounds of the upper and lower golden trace data may not be considered anomalous. An upper and lower golden trace may define upper and lower limits, may define a guardband, etc. Golden trace data 508 may include data from multiple processing runs, multiple process chambers, etc. Selecting traces for golden trace data 508 may include extracting correlations between trace data and metrology data, e.g., mapping the impact of trace data on metrology data. Selecting traces for golden trace data 508 may include selecting trace data associated with products exhibiting acceptable metrology metrics of a type correlated with the selected trace data. Golden trace data may be measured data or synthetic data. Synthetic golden trace data may be generated by a subject matter expert. Synthetic golden trace data may be generated by a model. Synthetic golden trace data may be generated by a machine learning model, such as a recursive neural network. Synthetic golden trace data may be generated by a statistical or heuristic model. Synthetic golden trace data may be generated by a physics-based model. Synthetic golden trace data may be generated by a digital twin model (e.g., a virtual representation of physical equipment, such as a manufacturing chamber).

Golden trace data 508 is provided to corrective action recommendation model 510. Corrective action recommendation model 510 may recommend corrective action, may schedule corrective action performance, may cause performance of corrective actions, etc. Corrective action recommendation model 510 may generate data as output including recommended corrective actions 520. Corrective action recommendation model 510 may recommend updates to one or more equipment constants of one or more process chambers in a fleet of process chambers.

Corrective action recommendation model 510 may receive further input. The model may receive fleet trace data 516. The model may receive golden chamber equipment constants 518. The model may receive fleet equipment constants 514. The model may receive fleet metrology 512. The model may receive golden chamber metrology data 502. Fleet metrology 512 and golden chamber metrology data 502 may be optionally provided to corrective action recommendation model 510. In some embodiments, corrective action recommendation model 510 may be configured to recommend corrective actions to increase a resemblance between processed products and products represented in golden metrology data. In some embodiments, corrective action recommendation model 510 may be configured to recommend corrective actions to increase resemblance between trace data of one or more chambers of a fleet of process chambers and golden trace data.

FIG. 5B is a block diagram depicting operations of a corrective action recommendation model 530, according to some embodiments. Corrective action recommendation model 530 may be corrective action recommendation model 510 of FIG. 5A. Corrective action recommendation model 530 may be a single model, a group of models, an ensemble model, or the like. Corrective action recommendation model 530 may include one or more machine learning models, heuristic models, rule-based models, statistical models, etc. Some operations of corrective actions recommendation model 530 may be performed by a user and/or subject matter expert, in some embodiments.

Corrective action recommendation model 530 includes trace to metrology correlation 532. Trace to metrology correlation 532 may include on or more models. Trace to metrology correlation 532 may identify relationships between metrology outputs of a manufacturing process and trace data. Trace to metrology correlation 532 may identify causal relationships between trace sensor data and metrology data. Trace to metrology correlation 532 may predict metrology data based on trace data. Analogous models may be applicable for other metrics, such as correlating trace data to environmental impact, energy use, throughput, or the like.

Corrective action recommendation model 530 includes equipment constant to trace correlation 534. Parameter to trace correlation may include correlating manufacturing parameters to trace data. Parameter to trace correlation 534 may include determining causal relationships between manufacturing parameters and trace data. Parameter to trace correlation 534 may include determining effects of recipes, set points, equipment constants, equipment components, and the like on trace data. Analogous models may be applicable for other metrics, such as correlating parameter data to environmental impact, energy use, throughput, or the like.

Corrective action recommendation model 530 includes chamber differentiation 536. Chamber differentiation 536 may include determining differences between chambers, tools, sets of processing equipment, or the like. Chamber differentiation 536 may determine how different chambers differ in response to changing parameters, equipment constants, trace data, or the like. Chamber differentiation 536 may, for example, allow corrective action recommendation model 530 to compensate for differences in installed components, variations within manufacturing tolerances of components of manufacturing equipment, differences as chambers age, or the like.

Corrective action recommendation model 530 includes parameter update scheduling 538. Parameter update scheduling 538 may perform operations directing to determining locations, timings, conditions, etc., for performing parameter updates. Parameter update scheduling 538 may include scheduling updates of equipment constants. Updating equipment constants (e.g., as opposed to updating recipes) may allow the same recipe to be performed on a number of chambers, with chamber differences compensated for by applying equipment constant updates on a chamber-by-chamber basis. Parameter update scheduling 538 may include determinations of risk of a parameter change (e.g., how likely a parameter change is to have a negative effect on process performance). Parameter update scheduling 538 may include determinations of effectiveness of a parameter change (e.g., how likely a parameter change is to have an intended effect on trace data, metrology data, or another output metric). Parameter update scheduling 538 may include scheduling conditional updates, e.g., several updates may be planned to be performed over a period of time, conditional on trace data or another output metric. Parameter update scheduling 538 may include selecting different updates for different chambers. Data may be consulted after a number of processing runs to determine effectiveness of various updates, schedule additional updates, etc.

Corrective action recommendation model 530 may include further components. Corrective action recommendation model 530 may include fewer components. Corrective action recommendation model 530 may be configured to recommend corrective actions. Corrective action recommendation model 530 may be configured to recommend and/or implement parameter updates. Corrective action recommendation model 530 may be configured to recommend and/or implement equipment constant updates. Corrective action recommendation model 530 may be configured to perform chamber matching, fleet matching, and/or process optimization procedures.

Figure 6:
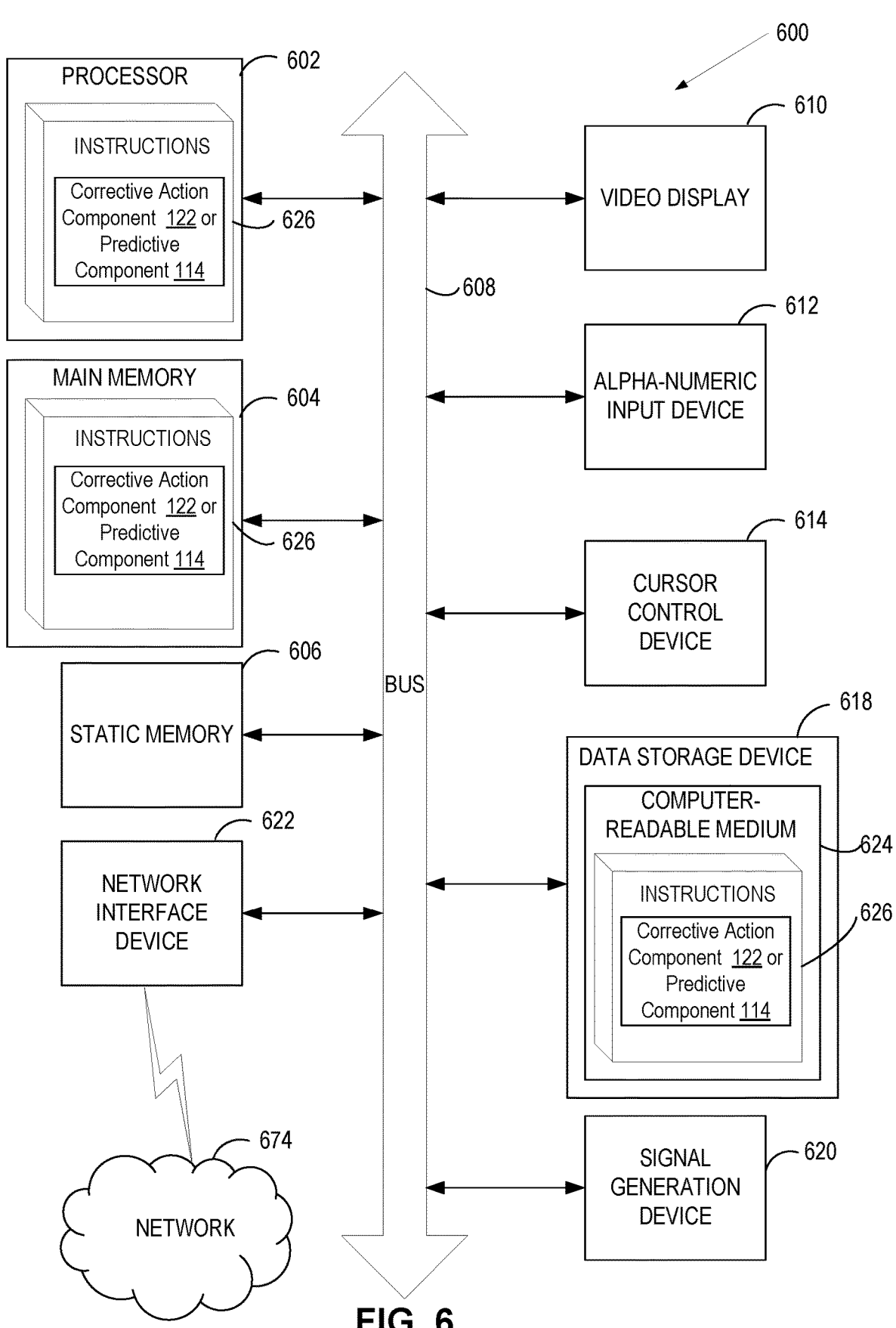
FIG. 6 is a block diagram illustrating a computer system, according to some embodiments.

FIG. 6 is a block diagram illustrating a computer system 600, according to some embodiments. In some embodiments, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a Set-Top Box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., Random Access Memory (RAM)), a non-volatile memory 606 (e.g., Read-Only Memory (ROM) or Electrically-Erasable Programmable ROM (EEPROM)), and a data storage device 618, which may communicate with each other via a bus 608.

Processing device 602 may be provided by one or more processors such as a general purpose processor (such as, for example, a Complex Instruction Set Computing (CISC) microprocessor, a Reduced Instruction Set Computing (RISC) microprocessor, a Very Long Instruction Word (VLIW) microprocessor, a microprocessor implementing other types of instruction sets, or a microprocessor implementing a combination of types of instruction sets) or a specialized processor (such as, for example, an Application Specific Integrated Circuit (ASIC), a Field Programmable Gate Array (FPGA), a Digital Signal Processor (DSP), or a network processor).

Computer system 600 may further include a network interface device 622 (e.g., coupled to network 674). Computer system 600 also may include a video display unit 610 (e.g., an LCD), an alphanumeric input device 612 (e.g., a keyboard), a cursor control device 614 (e.g., a mouse), and a signal generation device 620.

In some embodiments, data storage device 618 may include a non-transitory computer-readable storage medium 624 (e.g., non-transitory machine-readable medium) on which may store instructions 626 encoding any one or more of the methods or functions described herein, including instructions encoding components of FIG. 1 (e.g., predictive component 114, corrective action component 122, model 190, etc.) and for implementing methods described herein.

Instructions 626 may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "performing," "providing," "obtaining," "causing," "accessing," "determining," "adding," "using," "training," "reducing," "generating," "correcting," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may include a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods described herein and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and embodiments, it will be recognized that the present disclosure is not limited to the examples and embodiments described. The scope of the disclosure should be determined with reference to the following claims, along with the full scope of equivalents to which the claims are entitled.

What is claimed is:

1. A method, comprising:

receiving, by a processing device, first trace data associated with a first processing chamber, wherein the first processing chamber satisfies one or more performance metrics;

generating target trace data based on the first trace data associated with the first processing chamber;

receiving second trace data associated with a second processing chamber, wherein the second processing chamber does not satisfy the one or more performance metrics;

generating, based on the target trace data and the second trace data, a first recommended corrective action associated with the second processing chamber and a second recommended corrective action associated with the second processing chamber, wherein the first recommended corrective action and the second recommended corrective action comprise updating one or more equipment constants of the second processing chamber;

scheduling performance of the first recommended corrective action and the second recommended corrective action such that the first recommended corrective action is scheduled to be performed before the second recommended corrective action; and performing the first recommended corrective action.

2. The method of claim 1, further comprising:

receiving first metrology data of a first substrate associated with the first trace data; and receiving second metrology data of a second substrate associated with the second trace data, wherein the first recommended corrective action is further based on the first metrology data and the second metrology data.

3. The method of claim 1, further comprising:

receiving a first set of equipment constants associated with the first processing chamber; and receiving a second set of equipment constants associated with the second processing chamber, wherein the first recommended corrective action is further based on the first set of equipment constants and the second set of equipment constants.

4. The method of claim 1, further comprising generating a plurality of recommended corrective actions, wherein the plurality of recommended corrective actions comprises the first recommended corrective action, and wherein generating the plurality of recommended corrective actions comprises generating a schedule for implementing at least two of the plurality of recommended corrective actions.

5. The method of claim 1, further comprising:

receiving third trace data associated with a third processing chamber, wherein the third processing chamber does not satisfy the one or more performance metrics;

generating a plurality of recommended corrective actions, wherein the plurality of recommended corrective actions comprises the first recommended corrective action and a second recommended corrective action, and wherein the second recommended corrective action is associated with the third processing chamber; and performing the second recommended corrective action.

6. The method of claim 5, wherein performing of the first recommended corrective action and performing of the second recommended corrective action are scheduled such that at least one substrate is processed by the second processing chamber between performance of the first recommended corrective action and performance of the second recommended corrective action.

7. The method of claim 1, wherein generating the first recommended corrective action comprises:

providing the target trace data and the second trace data to a trained model;

receiving output from the trained model indicative of the first recommended corrective action; and scheduling performance of the first recommended corrective action.

8. The method of claim 7, wherein the trained model comprises a trained machine learning model.

9. The method of claim 1, wherein the target trace data comprises a range of trace data values that satisfy one or more performance metrics.

10. A system, comprising memory and a processing device coupled to the memory, wherein the processing device is to:

receive first trace data associated with a first processing chamber, wherein the first processing chamber satisfies one or more performance metrics;

generate target trace data based on the first trace data associated with the first processing chamber;

receive second trace data associated with a second processing chamber, wherein the second processing chamber does not satisfy the one or more performance metrics;

generate, based on the target trace data and the second trace data, a first recommended corrective action associated with the second processing chamber and a second recommended corrective action associated with the second processing chamber, wherein the first recommended corrective action and the second recommended corrective action comprise updating one or more equipment constants of the second processing chamber;

schedule performance of the first recommended corrective action and the second recommended corrective action such that the first recommended corrective action is scheduled to be performed before the second recommended corrective action; and perform the first recommended corrective action.

11. The system of claim 10, wherein the processing device is further to:

receive first metrology data of a first substrate associated with the first trace data; and receive second metrology data of a second substrate associated with the second trace data, wherein the first recommended corrective action is further based on the first metrology data and the second metrology data.

12. The system of claim 10, wherein the processing device is further to:

receive a first set of equipment constants associated with the first processing chamber; and receive a second set of equipment constants associated with the second processing chamber, wherein the first recommended corrective action is further based on the first set of equipment constants and the second set of equipment constants.

13. The system of claim 10, wherein the processing device is further to generate a plurality of recommended corrective actions, wherein the plurality of recommended corrective actions comprises the first recommended corrective action, and wherein generating the plurality of recommended corrective actions comprises generating a schedule for implementing at least two of the plurality of recommended corrective actions.

14. The system of claim 10, wherein the processing device is further to:

receive third trace data associated with a third processing chamber, wherein the third processing chamber does not satisfy the one or more performance metrics;

generate a plurality of recommended corrective actions, wherein the plurality of recommended corrective actions comprises the first recommended corrective action and a second recommended corrective action, and wherein the second recommended corrective action is associated with the third processing chamber; and performing the second recommended corrective action.

15. The system of claim 10, wherein the target trace data comprises a range of trace data values that satisfy one or more performance metrics.

16. A non-transitory machine-readable storage medium storing instructions which, when executed, cause a processing device to perform operations comprising:

receiving first trace data associated with a first processing chamber, wherein the first processing chamber satisfies one or more performance metrics;

generating target trace data based on the first trace data associated with the first processing chamber;

receiving second trace data associated with a second processing chamber, wherein the second processing chamber does not satisfy the one or more performance metrics;

generating, based on the target trace data and the second trace data, a first recommended corrective action associated with the second processing chamber and a second recommended corrective action associated with the second processing chamber, wherein the first recommended corrective action and the second recommended corrective action comprise updating one or more equipment constants of the second processing chamber;

scheduling performance of the first recommended corrective action and the second recommended corrective action such that the first recommended corrective action is scheduled to be performed before the second recommended corrective action; and performing the first recommended corrective action.

17. The non-transitory machine-readable storage medium of claim 16, wherein the operations further comprise:

receiving first metrology data of a first substrate associated with the first trace data; and receiving second metrology data of a second substrate associated with the second trace data, wherein the first recommended corrective action is further based on the first metrology data and the second metrology data.

18. The non-transitory machine-readable storage medium of claim 16, wherein the operations further comprise:

receiving a first set of equipment constants associated with the first processing chamber; and receiving a second set of equipment constants associated with the second processing chamber, wherein the first recommended corrective action is further based on the first set of equipment constants and the second set of equipment constants.

19. The non-transitory machine-readable storage medium of claim 16, wherein the operations further comprise generating a plurality of recommended corrective actions, wherein the plurality of recommended corrective actions comprises the first recommended corrective action, and wherein generating the plurality of recommended corrective actions comprises generating a schedule for implementing at least two of the plurality of recommended corrective actions.

20. The non-transitory machine-readable storage medium of claim 16, wherein generating the first recommended corrective action comprises:

providing the target trace data and the second trace data to a trained model;

receiving output from the trained model indicative of the first recommended corrective action; and scheduling performance of the first recommended corrective action.

* * * * *